(12) United States Patent
Kitahara

(10) Patent No.: US 7,772,326 B2
(45) Date of Patent: Aug. 10, 2010

(54) BLOCK COPOLYMER AND METHOD FOR PRODUCING SAME

(75) Inventor: Shizuo Kitahara, Tokyo (JP)

(73) Assignee: Zeon Corporation, Tokyo (JP)

( * ) Notice: Subject to any disclaimer, the term of this patent is extended or adjusted under 35 U.S.C. 154(b) by 487 days.

(21) Appl. No.: 11/547,189

(22) PCT Filed: Mar. 22, 2005

(86) PCT No.: PCT/JP2005/005169

§ 371 (c)(1),
(2), (4) Date: Sep. 29, 2006

(87) PCT Pub. No.: WO2005/092940

PCT Pub. Date: Oct. 6, 2005

(65) Prior Publication Data

US 2008/0258105 A1      Oct. 23, 2008

(30) Foreign Application Priority Data

Mar. 29, 2004 (JP) ............................. 2004-094497
Mar. 31, 2004 (JP) ............................. 2004-101960
Nov. 12, 2004 (JP) ............................. 2004-328875

(51) Int. Cl.
C08F 8/48        (2006.01)
C08F 293/00   (2006.01)
C08F 297/02   (2006.01)

(52) U.S. Cl. ...................... 525/314; 525/242; 525/313; 525/326.1; 525/331.9; 525/332.9; 525/333.3

(58) Field of Classification Search ................ 525/106, 525/153, 184, 191, 330, 333, 371, 242, 313, 525/314, 326.1, 331.9, 332.9, 333.3
See application file for complete search history.

(56) References Cited

U.S. PATENT DOCUMENTS 3,668,279 A    6/1972   Loveless et al.
4,242,471 A   12/1980   Lal
4,248,986 A *  2/1981   Lal et al. ...................... 525/99
5,211,875 A *  5/1993   Speer et al. ............. 252/188.28
5,314,634 A *  5/1994   Kenbeek et al. ............. 508/492
2005/0003220 A1   1/2005   Kitahara et al.
2005/0131149 A1   6/2005   Kitahara

FOREIGN PATENT DOCUMENTS

EP    0 441 286 A1     8/1991
JP    50-153084 A     12/1975
JP    51-12827         1/1976
JP    57-145103 A      9/1982
JP    6-94207 B2      11/1994
JP    2003-71992 A     3/2003
JP    2003-176380 A1   6/2003
JP    2003-192725 A    7/2003
JP    2003-231211 A    8/2003
JP    2004-002766 A    1/2004
JP    2004-59890 A     2/2004
WO    WO-98/06779 A1   2/1998
WO    WO-99/37730 A1   7/1999
WO    WO-01/03521 A1   1/2001
WO    WO-03/082934 A1 10/2003
WO    WO-2004/063230 A1 7/2004

OTHER PUBLICATIONS

Wang et al., European Polymer Journal, vol. 37, (2001), pp. 1895-1899.

* cited by examiner

*Primary Examiner*—Irina S Zemel
*Assistant Examiner*—Jeffrey Lenihan
(74) *Attorney, Agent, or Firm*—Birch, Stewart, Kolasch & Birch, LLP

(57) ABSTRACT

The invention provides a novel block copolymer which can significantly improve the adhesion between a molded product composed of a nonpolar polymer such as polypropylene or polyethylene and a coating material or a molded product composed of a polar polymer, as well as a method for producing the same. Disclosed is a block copolymer comprising at least one poly (aromatic vinyl) block having a weight-average molecular weight of 1,000 to 500,000 and at least one cyclized poly (conjugated diene) block, as well as an oxygen scavenger and a modifier for polymer molding material, which comprise the block copolymer as an active ingredient.

11 Claims, No Drawings

BLOCK COPOLYMER AND METHOD FOR PRODUCING SAME

TECHNICAL FIELD

The present invention relates to a block copolymer and a method for producing the same and in particular to a novel block copolymer which can significantly improve the adhesion between a molded product composed of a nonpolar polymer such as polypropylene or polyethylene and a coating material or a molded product composed of a polar polymer, as well as a method for producing the same. The present invention also relates to an oxygen scavenger used to prevent the deterioration, by oxygen, of qualities of foods, drinks, pharmaceutical preparations or the like and in particular to an oxygen scavenger which exhibits high oxygen absorption without adding a transition metal salt as a catalyst enhancing oxygen absorption and maintains high mechanical strength even after oxygen absorption.

BACKGROUND ART

A molded product composed of polyolefin such as polypropylene or polyethylene is used often after coating the surface thereof with a coating material to improve the appearance, durability or the like. However, the polyolefin is poor in polarity and is thus inferior in adhesion to a coating material to cause a problem of easy peel of the coating film.

It is known that a coating material containing a conjugated diene polymer-cyclized product, such as polyisoprene, adheres well to polyolefin (Patent Document 1). Further, for improving the adhesion, it is proposed to use a modified conjugated diene polymer-cyclized product obtained by adding maleic anhydride to a low-molecular-weight conjugated diene polymer having the amount of cis-1,4-bond of 70% or more, and then subjecting the addition product to cyclization reaction (Patent Document 2).

The conjugated diene polymer-cyclized product described above can be used to prepare a coating material whose adhesion to a polyolefin molded product is improved to a certain extent, but the degree of improvement is not sufficient.

On one hand, a film composed of polyolefin such as polypropylene or polyethylene is relatively inexpensive and is thus widely used in various applications, and particularly in the field of food wrapping film, such film is often used as a multilayer film laminated with layers of polar polymers such as polyamide and an ethylene-vinylalcohol copolymer, for the purpose of improving resistance to oils and greases and gas permeability. However, it is difficult to adhere a nonpolar polymer and a polar polymer each other, and thus an adhesive layer for improving the adhesion between the polymers is usually arranged as an intermediate layer.

For example, Patent Document 3 proposes use of an adhesive composition comprising a chlorinated polypropylene with a chlorine content of 35% by weight or less, a styrene-butadiene-styrene block copolymer and/or a styrene-ethylene-butylene-styrene block copolymer, and a terpene resin and/or an alicyclic hydrocarbon resin.

Patent Document 4 proposes an adhesive composition comprising an acid adduct of polyethylene obtained by using a metallocene catalyst and an ethylene-vinyl acetate copolymer and/or an ethylene-alkyl acrylate.

However, even if the adhesive composition described above is used, the adhesion between a nonpolar polymer and a polar polymer is insufficient, or sufficient adhesion may not be exhibited depending on the combination of polymers.

Because qualities of foods, drinks, pharmaceutical preparations or the like are deteriorated by oxygen, they should be stored in the absence of oxygen or under conditions where oxygen is scarcely present.

Accordingly, the charging of containers or packs for storing foods, drinks, pharmaceutical preparations or the like with nitrogen is also conducted, but has a problem of increased costs in production and a problem that the containers or packs, once opened, allow air to flow therein thus failing to prevent deterioration of qualities after opening. Accordingly, various attempts at removing oxygen from a system by absorbing oxygen remaining in a container or a pack have been examined.

As the method of removing oxygen from a container or a pack, a method arranging a separated small bag containing oxygen scavenger comprising an iron powder as a main ingredient is conventionally widely used. This method is inexpensive and attains a high rate of absorption of oxygen, but there arise inconveniences when a metal detector is used for detecting a foreign body or when a container or pack containing the oxygen scavenger bag is heated without opening in a microwave oven.

Accordingly, a container or packaging material made of resin is examined to confer oxygen absorbing properties on the container or packaging material itself.

For example, use of an oxygen scavenger comprising polyterpene such as poly($\alpha$-pinene), poly($\beta$-pinene), poly(dipentene) or the like and a transition metal salt such as cobalt neodecanoate, cobalt oleate or the like acting as an oxygen absorption catalyst, is proposed (Patent Document 7).

It is also proposed to use an oxygen scavenger comprising a conjugated diene polymer such as polyisoprene, 1,2-polybutadiene or the like and a transition metal salt (Patent Document 8).

It is further proposed to use an oxygen scavenger comprising a copolymer made of ethylene and cyclopentene, and a transition metal salt (Patent Document 9).

However, application of these conventional oxygen scavengers is sometimes difficult depending on uses because as the oxygen absorption reaction proceeds, the polymers can be deteriorated to lower mechanical strength significantly or elute the transition metal salts.

Patent Document 1: Japanese Patent Application Laid-Open (JP-A) No. 51-12827
Patent Document 2: JP-A No. 57-145103
Patent Document 3: Japanese Patent Application Publication No. 6-94207
Patent Document 4: Japanese Patent Application National Publication (Laid-Open) No. 2002-501108
Patent Document 5: JP-A No. 2003-192725
Patent Document 6: JP-A No. 2003-231211
Patent Document 7: Japanese Patent Application National Publication (Laid-Open) No. 2001-507045
Patent Document 8: JP-A No. 2003-71992
Patent Document 9: Japanese Patent Application National Publication (Laid-Open) No. 2003-504042

DISCLOSURE OF INVENTION

Problem to be Solved by the Invention

The object of the present invention is to provide a novel block copolymer which can improve the adhesion between a molded product composed of a nonpolar polymer such as polypropylene or polyethylene and a coating material or a molded product composed of a polar polymer, a method for producing the same, and an oxygen scavenger used for preventing the deterioration, by oxygen, of foods, drinks, pharmaceutical preparations or the like, particularly an oxygen scavenger which exhibits high oxygen absorption without adding a transition metal salt as a catalyst for improving oxygen absorption and which maintains mechanical strength highly even after oxygen absorption.

Means for Solving the Problem

The present inventors have previously proposed a binder resin comprising a modified cyclized polymer obtained by addition reaction of an ethylenically unsaturated dicarboxylic acid anhydride with a conjugated diene polymer-cyclized product having a cyclization degree of 30 to 95%, wherein the amount of the dicarboxylic acid anhydride added is 0.1 to 10% by weight, and the proportion of the added acid anhydride group is 60% by weight or more (Patent Document 5).

The present inventors have also proposed a composite molded product wherein a molded product composed of a nonpolar polymer and a molded product composed of a polar polymer are bonded to each other via an adhesive layer comprising a modified cyclized polymer obtained by addition reaction of an ethylenically unsaturated carboxylic acid with a conjugated diene polymer-cyclized product having a cyclization degree of 30 to 95%, the adhesive layer being based on the modified cyclized polymer wherein the amount of the carboxylic acid added is 0.1 to 20% by weight (Patent Document 6).

The present inventors made extensive study for further improving the adhesion between a molded product composed of a nonpolar polymer and a coating material or a molded product composed of a polar polymer. As a result, the present inventors found that the object of the invention can be achieved by using a novel block copolymer comprising at least one poly (aromatic vinyl) block having a weight-average molecular weight in a specific range and at least one cyclized poly (conjugated diene) block.

Further, the present inventors found that an oxygen scavenger containing, as an active ingredient, a block copolymer comprising a poly (aromatic vinyl) block and a cyclized poly (conjugated diene) block, obtained by cyclization reaction of an aromatic vinyl-conjugated diene block copolymer, exhibits high oxygen absorption without adding a transition metal salt as a catalyst and maintains mechanical strength highly even after oxygen absorption, and based on this finding, the present invention was completed.

According to the present invention, there are provided the following inventions (1) to (21):

(1) A block copolymer comprising at least one poly (aromatic vinyl) block having a weight-average molecular weight of 1,000 to 500,000 and at least one cyclized poly (conjugated diene) block.
(2) The above-mentioned block copolymer, comprising only one poly (aromatic vinyl) block and only one cyclized poly (conjugated diene) block.
(3) The above-mentioned block copolymer, wherein the degree of cyclization of the cyclized poly (conjugated diene) block is 10% or more.
(4) The above-mentioned block copolymer, having a weight-average molecular weight of 10,000 to 1,000,000.
(5) The above-mentioned block copolymer, wherein the content of the aromatic vinyl monomer unit is 1 to 90% by weight.
(6) The above-mentioned block copolymer, having a polar group.
(7) The above-mentioned block copolymer, wherein the content of the polar group is 0.1 to 200 millimoles/100 g.
(8) A method for producing a block copolymer, comprising the steps of:
polymerizing an aromatic vinyl monomer with a conjugated diene monomer by using an organic active metal catalyst to form an aromatic vinyl-conjugated diene block copolymer comprising at least one poly (aromatic vinyl) block having a weight-average molecular weight of 1,000 to 500,000 and at least one conjugated diene polymer block, and
cyclizing the conjugated diene polymer block in the block polymer by using a cyclization catalyst to form a cyclized poly (conjugated diene) block.
(9) The above-mentioned method, comprising a step of addition reaction of a polar group-containing compound with the cyclized poly (conjugated diene) block to introduce the polar group derived from the compound after the step of forming the cyclized poly (conjugated diene) block.
(10) The above-mentioned method, comprising a step of addition reaction of a polar group-containing compound with the conjugated diene polymer block in the aromatic vinyl-conjugated diene block copolymer to introduce the polar group derived from the compound before the step of forming the cyclized poly (conjugated diene) block.
(11) An oxygen scavenger comprising, as an active ingredient, the above-mentioned block copolymer.
(12) The above-mentioned oxygen scavenger, wherein the consumption degree of unsaturated bond in the cyclized poly (conjugated diene) block is 10% or more.
(13) The above-mentioned oxygen scavenger, further comprising a thermoplastic resin.
(14) The above-mentioned oxygen scavenger, wherein the thermoplastic resin is at least one member selected from the group consisting of a polyolefin resin, a polyester resin, a polyamide resin and a polyvinyl alcohol resin.
(15) The above-mentioned oxygen scavenger, comprising an antioxidant of 500 ppm or less.
(16) The above-mentioned oxygen scavenger, which is in the form of film, sheet or powder.
(17) A modifier for polymer molding material comprising, as an active ingredient, the above-mentioned block copolymer.
(18) A polymer composition comprising a polymer molding material containing the above-mentioned modifier for polymer molding material.
(19) A coating agent comprising the above-mentioned block copolymer.
(20) A powdery particle comprising the above-mentioned block copolymer.
(21) The above-mentioned powdery particle, further comprising a coloring agent.

Effect of the Invention

According to the present invention, there is provided a novel block copolymer which can significantly improve the adhesion between a molded product composed of a nonpolar polymer such as polypropylene or polyethylene and a coating material or a molded product composed of a polar polymer, as well as a method for producing the same. According to the present invention, there is also provided an oxygen scavenger which exhibits high oxygen absorption without adding a transition metal salt as a catalyst for improving oxygen absorption and which maintains mechanical strength highly even after oxygen absorption.

BEST MODE FOR CARRYING OUT THE INVENTION

Hereinafter, the present invention is described in detail.

(Block Copolymer)

The block copolymer of the present invention comprises at least one poly (aromatic vinyl) block having a weight-average molecular weight of 1,000 to 500,000 and at least one cyclized poly (conjugated diene) block.

The poly (aromatic vinyl) block is a block segment in a polymer obtained by polymerizing aromatic vinyl monomers.

Examples of the aromatic vinyl monomers include styrene, α-methyl styrene, p-isopropyl styrene, p-phenyl styrene, p-methoxy styrene, p-methoxymethyl styrene, p-tert-butoxy styrene, chloromethyl styrene, 2-fluorostyrene, 3-fluorostyrene, pentafluorostyrene, vinyl toluene, vinyl naphthalene, and vinyl anthracene. Among these monomers, styrene and α-methyl styrene are preferable, and styrene can be more preferably used. These monomers can be used alone, or two or more thereof can be used in combination.

The poly (aromatic vinyl) block is particularly preferably a block composed of only aromatic vinyl monomer units, but may contain the other monomer unit than the aromatic vinyl monomer unit in such a range that the effect of the invention is not inhibited substantially. Examples of the other monomer unit include monomer units derived from conjugated diene monomers such as 1,3-butadiene and isoprene. The content of the other monomer unit than the aromatic vinyl monomer unit in the poly (aromatic vinyl) block is preferably 10% by weight or less, more preferably 5% by weight or less.

The weight-average molecular weight of the poly (aromatic vinyl) block is 1,000 to 500,000, preferably 3,000 to 300,000, more preferably 5,000 to 100,000, still more preferably 8,000 to 50,000. When this weight-average molecular weight is low, the block copolymer is poor in the adhesion between a molded product composed of a nonpolar polymer and a coating material or a molded product composed of a polar polymer, while when the weight-average molecular weight is high, the block copolymer is difficult to handle in production or use or is poor in the adhesion between a molded product composed of a nonpolar polymer and a coating material or a molded product composed of a polar polymer. When the weight-average molecular weight is too low, the initial mechanical strength of an oxygen scavenger wherein the block copolymer is used tends to be lowered, and the decrease in mechanical strength of the oxygen scavenger after oxygen absorption tends to be increased. On the other hand, when the weight-average molecular weight is too high, the ratio of the cyclized poly (conjugated diene) block is relatively decreased, and the amount of oxygen absorbed tends to be decreased.

In the present invention, the weight-average molecular weight is a standard polystyrene-equivalent molecular weight determined by gel permeation chromatography.

The cyclized poly (conjugated diene) block contains, in its block segment, at least one 6-membered cyclic structure derived from at least two conjugated diene monomer units.

The cyclized poly (conjugated diene) block is formed usually by cyclizing the conjugated diene polymer block moiety in the aromatic vinyl-conjugated diene block copolymer by using a cyclization catalyst.

Examples of the conjugated diene monomer used to form the conjugated diene polymer block include 1,3-butadiene, isoprene, 2,3-dimethyl-1,3-butadiene, 2-phenyl-1,3-butadiene, 1,3-pentadiene, 2-methyl-1,3-pentadiene, 1,3-hexadiene, 4,5-diethyl-1,3-octadiene, and 3-butyl-1,3-octadiene. Among these monomers, 1,3-butadiene and isoprene are preferable for easily exhibiting the effect of the invention, and isoprene can be more preferably used. These monomers may be used alone or two or more thereof may be used in combination.

The conjugated diene polymer block is particularly preferably a block composed of only conjugated diene monomer units, but may contain the other monomer unit than the conjugated diene monomer unit in such a range that the effect of the invention is not inhibited substantially. Examples of the other monomer unit include monomer units derived from aromatic vinyl monomers such as α-methyl styrene, and styrene. The content of the other monomer unit than the conjugated diene monomer unit in the conjugated diene polymer block is preferably 10% by weight or less, more preferably 5% by weight or less. When this content is too high, the degree of cyclization of the block copolymer tends to be difficult to be regulated in the preferable range.

The degree of cyclization of the cyclized poly (conjugated diene) block is not particularly limited, and is usually 10% or more, preferably 40 to 95%, more preferably 60 to 90%, still more preferably 70 to 85%. When the degree of cyclization is too low, the block copolymer tends to be inferior in the adhesion between a molded product composed of a nonpolar polymer and a coating material or a molded product composed of a polar polymer, while it is difficult to produce the block copolymer having a cyclized poly (conjugated diene) block with high degree of cyclization, and it is easy to progress gelation thereof so that inconveniences sometimes happened in a step of applying the block copolymer solution.

The degree of cyclization can be determined as follows:

(1) The peak area (A) of proton derived from double bond of the conjugated diene polymer block moiety of the aromatic vinyl-conjugated diene block polymer used as the starting material is determined by $^1$H-NMR analysis.

(2) The peak area (B) of proton derived from double bond of the cyclized poly (conjugated diene) block moiety of the block copolymer after cyclization reaction is determined by $^1$H-NMR analysis.

(3) The degree of cyclization is determined from the following equation:

$$\text{Degree of cyclization}(\%) = \frac{(A)-(B)}{(A)} \times 100 \qquad \text{(equation 1)}$$

When the block copolymer is used in an oxygen scavenger, the consumption degree of unsaturated bond in the cyclized poly (conjugated diene) block is usually 10% or more, preferably 40 to 75%, more preferably 45 to 65%. When the consumption degree of unsaturated bond is too low, the amount of oxygen absorbed tends to be lowered, while it is difficult to produce the block copolymer having a cyclized poly (conjugated diene) block with high consumption degree of unsaturated bond, and it is easy to progress gelation thereof so that inconveniences sometimes happened when used.

The consumption degree of unsaturated bond in the cyclized poly (conjugated diene) block can be regulated by suitably selecting the amount of an acid catalyst in the cyclization reaction, the reaction temperate and the reaction time.

The consumption degree of unsaturated bond is an indicator of the degree of reduction of the unsaturated bond by cyclization reaction in the conjugated diene monomer unit moiety in the conjugated diene polymer, which is a numerical value determined in the following manner and determined by proton NMR measurement with reference to methods described in the following literatures (i) and (ii):

(i) M. a. Golub and J. Heller, Can. J. Chem., 41, 937 (1963).
(ii) Y. Tanaka and H. Sato, J. Polym. Sci: Poly. Chem. Ed., 17, 3027 (1979).

That is, the ratio of the peak area of proton directly bound to double bond to the peak area of all protons in the conjugated diene monomer unit moiety in the conjugated diene polymer is measured before and after the cyclization reaction by proton NMR analysis, to determine the degree of reduction.

Assuming that in the conjugated diene monomer unit moiety in the conjugated diene polymer, the peak area of total protons before the cyclization reaction is SBT, the peak area of proton bound directly to double bond before the cyclization reaction is SBU, the peak area of total protons after the cyclization reaction is SAT, and the peak area of proton bound directly to double bond after the cyclization reaction is SAU, the peak area ratio (SB) of proton bound directly to double bond before the cyclization reaction is as follows:

$SB = SBU/SBT$, and the peak area ratio (SA) of proton bound directly to double bond after the cyclization reaction is as follows:

$SA = SAU/SAT$.

Accordingly, the consumption degree of unsaturated bond is determined according to the following equation:

Consumption degree of unsaturated bond (%)=100×($SB-SA$)/$SB$

The weight-average molecular weight of the cyclized poly (conjugated diene) block is preferably 5,000 to 500,000, more preferably 10,000 to 400,000, still more preferably 20,000 to 300,000. When this weight-average molecular weight is too low, the block copolymer tends to be poor in the adhesion between a molded product composed of a nonpolar polymer and a coating material or a molded product composed of a polar polymer, while when the weight-average molecular weight is high, the block copolymer tends to be difficult to handle in production or use. When this weight-average molecular weight is too low, the ratio of the cyclized poly (conjugated diene) block tends to be relatively lowered to reduce the amount of oxygen absorbed, while when the weight-average molecular weight is high, the block copolymer tends to be difficult to handle in production or use.

The mode of bonding in the block copolymer of the present invention is not particularly limited, and can be expressed in the following general formulae (1) to (5) wherein the poly (aromatic vinyl) block is A, and the cyclized poly (conjugated diene) block is B:

| (A-B)n | general formula (1) |
| A-(B-A)m | general formula (2) |
| B-(A-B)p | general formula (3) |
| (A-B)qX | general formula (4) |
| (B-A)rY | general formula (5) | wherein each of n, m, p, q and r is an integer of 1 or more, and each of X and Y is a residue of a coupling agent having at least two coupling sites.

In particular, the block copolymer comprising only one poly (aromatic vinyl) block and only one cyclized poly (conjugated diene) block is preferable in respect of ease in production and exhibition of the effect.

The weight-average molecular weight of the block copolymer of the present invention is preferably 10,000 to 1,000,000, more preferably 50,000 to 500,000, still more preferably 70,000 to 350,000. When this weight-average molecular weight is too low, the block copolymer tends to be inferior in the adhesion between a molded product composed of a nonpolar polymer and a coating material or a molded product composed of a polar polymer, while when the weight-average molecular weight is high, the block copolymer tends to be difficult to handle in production or use. When the weight-average molecular weight is too low, the initial mechanical strength of the oxygen scavenger tends to be decreased, and the decrease in mechanical strength of the oxygen scavenger after oxygen absorption tends to be increased. On the other hand, when the weight-average molecular weight is too high, the block copolymer tends to be difficult to handle in production or use.

The weight-average molecular weight of the block copolymer can be regulated by suitably regulating the weight-average molecular weight of the aromatic vinyl-conjugated diene block copolymer used as the starting material.

The content of the aromatic vinyl monomer unit in the block copolymer of the present invention is not particularly limited, but is usually 1 to 90% by weight, preferably 5 to 50% by weight, more preferably 10 to 30% by weight. When this content is too low or too high, the effect of the invention tends to be difficult to be exhibited. When the content is too low, the initial mechanical strength of the oxygen scavenger tends to be lowered, and the decrease in mechanical strength of the oxygen scavenger after oxygen absorption tends to be increased. On the other hand, when the content of the aromatic vinyl monomer unit is too high, the ratio of the cyclized poly (conjugated diene) block is relatively decreased, and the amount of oxygen absorbed tends to be decreased.

The glass transition temperature (Tg) of the cyclized poly (conjugated diene) block in the block copolymer is not particularly limited and can be suitably selected depending on applications, but is usually −50 to 200° C., preferably 0 to 100° C. When the Tg of the cyclized poly (conjugated diene) block is outside of these ranges, the block copolymer may be problematic in handling.

The Tg of the cyclized poly (conjugated diene) block can be regulated by suitably selecting the formulation of the conjugated diene polymer used as the starting material and the consumption degree of unsaturated bond.

The amount of gel in the block copolymer of the present invention is not particularly limited, but is usually 10% by weight or less, preferably 5% by weight or less. Particularly, the block copolymer has no gel substantially. When the amount of gel is large, there may arise a problem in a step of applying the block copolymer solution.

The block copolymer of the present invention preferably has a polar group. When the block copolymer has a polar group, the block copolymer can further improve the adhesion between a molded product composed of a nonpolar polymer and a coating material or a molded product composed of a polar polymer. When the block copolymer has a polar group, the block copolymer can provide an oxygen scavenger excellent in oxygen absorption and processability.

Examples of the polar group include a functional group containing an atom such as an oxygen atom, nitrogen atom, sulfur atom, silicon atom or halogen atom other than a carbon or hydrogen atom. Examples of the polar group include an acid anhydride group, carboxyl group, hydroxyl group, thiol group, ester group, epoxy group, amino group, amide group, cyano group, silyl group and halogen atom.

The polar group is preferably an acid anhydride group, carboxyl group, hydroxyl group, ester group, epoxy group or amino group, more preferably an acid anhydride group, carboxyl group or hydroxyl group, still more preferably an acid anhydride group or carboxyl group, from the viewpoint of its excellent effect of improving adhesiveness.

The content of the polar group is preferably in the range of 1 to 200 millimoles, more preferably 1 to 100 millimoles, still more preferably 5 to 50 millimoles, per 100 g of the block copolymer. When the polar group is in the above range, the adhesion between a molded product composed of a nonpolar polymer and a coating material or a molded product composed of a polar polymer can be further improved. When the content of the polar group is in the above range, an oxygen scavenger more excellent in balance between oxygen absorption and retention of mechanical strength can be obtained.

When the block copolymer is used in an oxygen scavenger, the block copolymer preferably contains an antioxidant.

The content of the antioxidant in the block copolymer is preferably 500 ppm or less, more preferably 400 ppm or less, still more preferably 300 ppm or less. When the content is too high, the oxygen adsorption of the oxygen scavenger obtained by using the block copolymer tends to be lowered. The lower-limit content of the antioxidant is preferably 10 ppm, more preferably 20 ppm.

The usable antioxidant is not particularly limited insofar as it is usually used in the field of resin material or rubber material. Specific examples thereof include a phenol antioxidant, and a phosphite antioxidant.

Specific examples of the phenol antioxidant include vitamin E, tetrakis-(methylene-3-(3',5'-t-butyl-4'-hydroxyphenyl)propionate) methane, 2,5-di-t-butyl hydroquinone, 2,6-di-t-butyl-p-cresol, 4,4'-thiobis-(6-t-butylphenol), 2,2'-methylene-bis-(4-methyl-6-t-butylphenol), octadecyl-3-(3', 5'-di-t-butyl-4'-hydroxyphenyl)propionate, 4,4'-thiobis-(6-t-butylphenol), 2-t-butyl-6-(3-t-butyl-2-hydroxy-5-methylbenzyl)-4-met hylphenyl acrylate, pentaerythritol tetrakis(3-laurylthiopropionate), pentaerythritol tetrakis[3-(3,5-di-t-butyl-4-hydroxyphenyl)propionate], 2,6-di-(t-butyl)-4-methyl phenol, 2,2'-methylene bis-(6-t-butyl-p-cresol), 1,3,5-tris(3,5-t-butyl-4-hydroxybenzyl)-1,3,5-triazine-2,4,6-(1H,3H,5H)-trione, and 2,6-di-t-butyl-4-(4,6-bis-octylthio)-1,3,5-triazin-2-y lamino) phenol.

Specific examples of the phosphite antioxidant include 2,2'-methylene bis(4,6-di-t-butylphenyl)octyl phosphite, tris (2,4-di-t-butylphenyl)phosphite, triphenyl phosphite, tris (nonylphenyl)phosphite, tris(2-ethylhexyl)phosphite, tridecyl phosphite, tris(tridecyl)phosphite, diphenyl mono(2-ethylhexyl)phosphite, diphenyl monodecyl phosphite, didecyl monophenyl phosphite, diphenyl mono(tridecyl) phosphite, dilauryl hydrogen phosphite, diphenyl hydrogen phosphite, tetraphenyl dipropylene glycol diphosphite, tetraphenyl tetra(tridecyl)pentaerythritol tetraphosphite, tetra (tridecyl)-4,4'-isopropylidene diphenyl diphosphite, bis(nonylphenyl)pentaerythritol diphosphite, distearyl pentaerythritol diphosphite, a hydrogenated bisphenol A pentaerythritol phosphite polymer, bis(2,4-di-t-butylphenyl)pentaerythritol diphosphite, bis(2,4-di-t-butyl-3-methylphenyl) pentaerythritol diphosphite, and phosphite compounds represented by formulae (1) to (4) below.

These antioxidants may be used alone or as a mixture of two or more thereof.

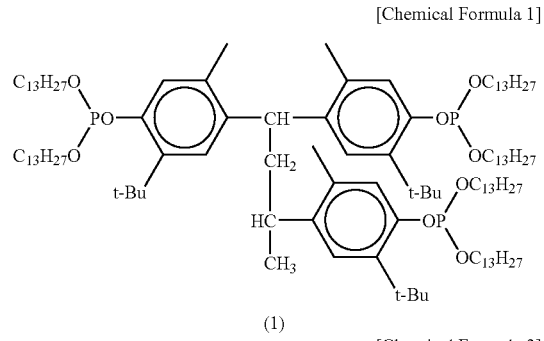

[Chemical Formula 1]

(1)

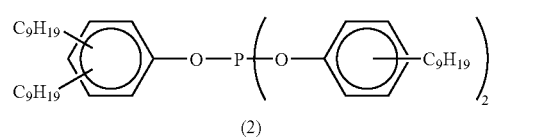

[Chemical Formula 2]

(2)

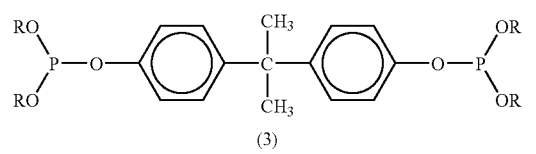

[Chemical Formula 3]

(3)

R: C$_{12}$-C$_{15}$ alkyl

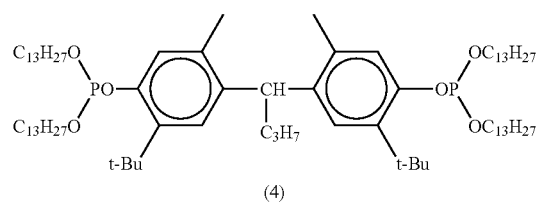

[Chemical Formula 4]

(4)

(Method for Producing the Block Copolymer)

The method for producing the block copolymer according to the present invention comprises:

(1) a step of polymerizing an aromatic vinyl monomer with a conjugated diene monomer by using an organic active metal catalyst to form an aromatic vinyl-conjugated diene block copolymer comprising at least one poly (aromatic vinyl) block having a weight-average molecular weight of to 500, 000 and at least one conjugated diene polymer block, and (2) a step of cyclizing the conjugated diene polymer block in the block polymer by using a cyclization catalyst to form a cyclized poly (conjugated diene) block.

(Step (1))

In the step (1), an aromatic vinyl monomer is polymerized with a conjugated diene monomer by using an organic active metal catalyst to form an aromatic vinyl-conjugated diene block copolymer comprising at least one poly (aromatic vinyl) block having a weight-average molecular weight of 1,000 to 500,000 and at least one conjugated diene polymer block.

The poly (aromatic vinyl) block in the aromatic vinyl-conjugated diene block copolymer is retained even after the subsequent step (2).

As the aromatic vinyl monomer and the conjugated diene monomer, those described above can be used. The ratio of each monomer used may be regulated depending on the desired block copolymer.

The organic active metal catalyst is not particularly limited insofar as it is a catalyst capable of conducting living polymerization of the above monomers. Examples of the organic active metal catalyst include an organic alkali metal compound, and an organic alkaline earth metal compound. In particular, the organic alkali metal compound can be preferably used.

Examples of the organic alkali metal compound include organic monolithium compounds such as n-butyl lithium, sec-butyl lithium, t-butyl lithium, hexyl lithium, phenyl lithium, and stilbene lithium; organic polyvalent lithium compounds such as dilithiomethane, 1,4-dibutylthiobutane, 1,4-dilithio-2-ethyl cyclohexane, and 1,3,5-trilithiobenzene; and sodium naphthalene, potassium naphthalene and the like. Among these compounds, the organic lithium compound is preferable, and the organic monolithium compound can be more preferably used.

The organic alkali metal compound can also be used as an organic alkali metal amide compound obtained by reacting a secondary amine with the organic alkali metal compound.

Examples of the secondary amine include aliphatic secondary amines such as dimethylamine, methylethylamine, methylpropylamine, methylbutylamine, methylamylamine, amylhexylamine, diethylamine, ethylpropylamine, ethylbutylamine, ethylhexylamine, dipropylamine, diisopropylamine, propylbutylamine, dibutylamine, diamylamine, dihexylamine, diheptylamine, dioctylamine, methylcyclopentylamine, ethylcyclopentylamine, methylcyclohexylamine, dicyclopentylamine, and dicyclohexylamine; aromatic secondary amines such as diphenylamine, N-methylaniline, N-ethylaniline, dibenzylamine, N-methylbenzylamine, and N-ethylphenethylamine; cyclic imines such as aziridine, acetizine, pyrrolidine, piperidine, 2-methylpiperidine, 3-methylpiperidine, 4-methylpiperidine, 3,5-dimethylpiperidine, 2-ethylpiperidine, hexamethylene imine, heptamethylene imine, dodecamethylene imine, coniine, morpholine, oxazine, pyrroline, pyrrole, and azepine. These secondary amines are used alone or as a mixture of two or more thereof.

The amount of the secondary amine used is usually 0.5 to 2 equivalents, preferably 0.8 to 1.5 equivalents, more preferably 1 to 1.2 equivalents, based on the metal in the organic alkali metal compound.

As the organic alkaline earth metal compound, compounds having metals such as barium, strontium, calcium or the like, disclosed in for example JP-A Nos. 51-115590, 52-9090, 52-17591, 52-30543, 52-48910, 52-98077, 56-112916, 57-100146 or the like. Specific examples thereof include n-butyl magnesium bromide, n-hexyl magnesium bromide, ethoxy calcium, t-butoxy strontium, ethoxy barium, isopropoxy barium, ethyl mercapto barium, t-butoxy barium, phenoxy barium, diethyl amino barium, and ethyl barium.

The above organic active metal catalysts can be used alone or as a mixture of two or more thereof. Depending on the type of the catalyst used, the amount of the catalyst may be suitably selected such that the weight-average molecular weight of the poly (aromatic vinyl) block comes to be in the desired range, and usually the amount of the catalyst is in the range of 0.01 to 100 millimoles, preferably 0.05 to 20 millimoles, more preferably 0.1 to 100 millimoles, per 100 g of the monomers.

For forming the aromatic vinyl-conjugated diene block copolymer, a conventionally known method can be used, and usually the aromatic vinyl monomer and the conjugated diene monomer may be successively added to, and polymerized in, a reaction system.

The aromatic vinyl monomer may be first polymerized to form a poly (aromatic vinyl) block, followed by polymerization of the conjugated diene monomer to form a conjugated diene polymer block, or polymerization may be carried out successively in the reverse order.

Alternatively, a part of the aromatic vinyl monomer is polymerized to form a poly (aromatic vinyl) block and then the conjugated diene monomer is polymerized to a conjugated diene polymer block, and the remainder of the aromatic vinyl monomer is polymerized to form a poly (aromatic vinyl) block.

The polymerization using the above catalyst is carried out usually in a polymerization solvent. The polymerization solvent is not particularly limited insofar as the polymerization is not inhibited.

Examples of the polymerization solvent include aliphatic saturated hydrocarbons such as n-butane, n-pentane, iso-pentane, n-hexane, n-heptane, and iso-octane; alicyclic saturated hydrocarbons such as cyclopentane, cyclohexane, and methylcyclopentane; and aromatic hydrocarbons such as benzene, and toluene. Among these solvents, n-hexane, cyclohexane and toluene are preferable. An unsaturated hydrocarbon extremely poor in polymerizability, such as 1-butene, cis-2-butene or 2-hexene, can be simultaneously used if necessary. These polymerization solvents can be used alone or as a mixture of two or more thereof.

The amount of the polymerization solvent used is not particularly limited, and the solvent is used usually in such an amount that the concentration of the monomer used in polymerization comes to be in the range of 1 to 50% by weight, preferably 10 to 40% by weight.

In the polymerization reaction, a polar compound can be used to regulate the bonding structure of the conjugated diene monomer units. The polar compound is not particularly limited insofar as it can be used in usual anion polymerization using the organic active metal catalyst.

Examples of the polar compound include ether compounds such as dibutyl ether, ethylene glycol dibutyl ether, and tetra hydrofuran; tertiary amines such as tetramethyl ethylene diamine, trimethylamine, triethylamine, pyridine, and quinuclidine; alkali metal alkoxides such as potassium-t-amyl oxide, and potassium-t-butyl oxide; and phosphine derivatives such as triphenyl phosphine and the like. Among these compounds, the tertiary amine and the ether compound are preferable, the tertiary amine is more preferable, and tetramethyl ethylene diamine can be particularly preferably used. These polar compounds can be used alone or as a mixture of two or more thereof.

When the polar compound is used, the amount thereof is usually 200 moles or less, preferably 0.1 to 100 moles, more preferably 0.5 to 50 moles, still more preferably 0.8 to 20 moles, per 1 mole of the organic active metal catalyst.

The polymerization reaction is carried out usually in the range of −78 to 150° C. in a polymerization mode such as a batch or continuous system.

The polymerization time is not particularly limited, and the polymerization reaction is preferably conducted until the monomers used in the polymerization react almost quantitatively.

While the activity of the polymerization terminals of the aromatic vinyl-conjugated diene block copolymer obtained in the manner described above is maintained, a coupling agent having at least two coupling sites capable of reacting with the terminals may be added to form a coupling product.

The coupling agent is not particularly limited, and a conventionally known coupling agent can be used, and examples thereof include a bifunctional coupling agent, a trifunctional coupling agent, a tetrafunctional coupling agent, and a pentafunctional or more coupling agent.

Examples of the bifunctional coupling agent include bifunctional halogenated silanes such as dichlorosilane, monomethyl dichlorosilane, and dimethyl dichlorosilane; bifunctional alkoxy silanes such as diphenyl dimethoxy silane, and diphenyl diethoxy silane; bifunctional halogenated alkanes such as dichloroethane, dibromoethane, methylene chloride, and dibromomethane; bifunctional halogenated tins such as dichlorotin, monomethyl dichlorotin, dimethyl dichlorotin, monoethyl dichlorotin, diethyl dichlorotin, monobutyl dichlorotin, and dibutyl dichlorotin; and dibromobenzene, benzoic acid, CO, 2-chloropropene and the like.

Examples of the trifunctional coupling agent include trifunctional halogenated alkanes such as trichloroethane, and trichloropropane; trifunctional halogenated silanes such as methyl trichlorosilane, and ethyl trichlorosilane; and trifunctional alkoxy silanes such as methyl trimethoxy silane, phenyl trimethoxy silane, and phenyl triethoxy silane.

Examples of the tetrafunctional coupling agent include tetrafunctional halogenated alkanes such as carbon tetrachloride, carbon tetrabromide, and tetrachloroethane; tetrafunctional halogenated silanes such as tetrachlorosilane, and tetrabromosilane; tetrafunctional alkoxysilanes such as tetramethoxysilane, and tetraethoxy silane; and tetrafunctional halogenated tins such as tetrachlorotin, and tetrabromo tin.

Examples of the pentafunctional or more coupling agent include 1,1,1,2,2-pentachloroethane, perchloroethane, pentachlorobenzene, perchlorobenzene, octabromodiphenyl ether, and decabromodiphenyl ether.

The amount of the coupling agent used is suitably selected such that the ratio of the respective coupling products incorporated comes to be in a desired range.

The reaction temperature in the reaction of the above-described active polymer with the coupling agent (referred to herein after as "coupling reaction") is usually room temperature to 120° C., preferably 40 to 100° C., and the reaction time is usually 1 minute to several hours, preferably 10 minutes to 2 hours. In this range, the reaction sufficiently proceeds, and there may not occur inconveniences such as gelation attributable to side reaction.

Thereafter, the polymerization reaction is terminated by adding a polymerization terminator if necessary.

Examples of the polymerization terminator include alcohols such as methanol, ethanol, isopropanol, n-butanol, and t-butanol; phenols such as phenol, methyl phenol, and 2,6-tert-butyl-hydroxy toluene; and water. Among these terminators, alcohols and water are preferable, and water can be more preferably used. The amount of the terminator used is usually 1 to 100 equivalents, preferably 1 to 50 equivalents, more preferably 1 to 10 equivalents, relative to the metal in the organic active metal catalyst used in the polymerization.

When water is used as the polymerization terminator, an anionic or nonionic surfactant such as a sodium salt of β-naphthalene sulfonic acid-formalin condensate can be added for the purpose of facilitating dispersion thereof into the polymerization solution.

(Step (2))

In the step (2), the conjugated diene polymer block in the aromatic vinyl-conjugated diene block copolymer obtained in the step (1) is cyclized by using a cyclization catalyst to form a cyclized poly (conjugated diene) block.

As the cyclization catalyst, a conventionally known catalyst for cyclizing a conjugated diene polymer such as polyisoprene or polybutadiene can be used.

Examples of the cyclization catalyst include sulfuric acid; organic sulfonic acid compounds including organic sulfonic acid such as monofluoromethane sulfonic acid, difluoromethane sulfonic acid, p-toluene sulfonic acid, xylene sulfonic acid, alkyl benzene sulfonic acids having alkyl group of 2 to 18 carbon atoms, anhydrides thereof, and alkyl esters thereof; and metal halides such as boron trifluoride, boron trichloride, tin tetrachloride, titanium tetrachloride, aluminum chloride, diethyl ammonium monochloride, aluminum bromide, antimony pentachloride, tungsten hexachloride, and iron chloride. These cyclization catalysts can be used alone or as a mixture of two or more thereof.

Among these cyclization catalysts, the organic sulfonic acid compound is preferable, and p-toluene sulfonic acid and xylene sulfonic acid can be more preferably used.

The amount of the cyclization catalyst used can be selected suitably depending on the type of the cyclization catalyst and the required degree of cyclization, the amount of the cyclization catalyst is usually 0.05 to 10 parts by weight, preferably 0.1 to 5 parts by weight, more preferably 0.3 to 2 parts by weight, per 100 parts by weight of the aromatic vinyl-conjugated diene block copolymer.

The cyclization reaction, though proceeding by merely bringing the aromatic vinyl-conjugated diene block copolymer into contact with the cyclization catalyst, is carried out usually in an inert solvent. The inert solvent is not particularly limited insofar as the cyclization reaction is not inhibited.

As the inert solvent, the above-mentioned polymerization solvent can be used. In particular, a solvent having a boiling point of 70° C. or more can be preferably used.

When the inert solvent is used in the polymerization reaction of the aromatic vinyl-conjugated diene block copolymer, the solvent can also be used as the solvent for the cyclization reaction, and in this case, the polymerization reaction solution after the polymerization reaction is finished can be subjected to cyclization reaction by adding the acid catalyst.

The amount of the inert solvent used is not particularly limited, and the amount is determined such that the concentration of the block copolymer becomes preferably 5 to 60% by weight, more preferably 20 to 40% by weight.

In the cyclization reaction, the reaction temperature is usually 50 to 150° C., preferably 75 to 100° C., and the reaction time is usually 0.5 to 10 hours, preferably 2 to 5 hours.

The cyclization reaction can be conducted under pressure, under reduced pressure or at atmospheric pressure, but is conducted desirably at atmospheric pressure from the viewpoint of ease in operation, preferably in a dry stream, more preferably in an atmosphere such as dry nitrogen or dry argon, thereby enabling prevention of side reactions attributable to water.

As described above, the conjugated diene polymer block in the aromatic vinyl-conjugated diene block copolymer is cyclized to form a cyclized poly (conjugated diene) block, thus giving the block copolymer of the invention comprising the poly (aromatic vinyl) block and the cyclized poly (conjugated diene) block.

The resulting block copolymer is obtained usually as solids by inactivating the cyclization catalyst in a usual manner, then removing the cyclization catalyst residues and removing the inert solvent.

To obtain the polar group-containing block copolymer of the present invention, the step (2) is followed by a step (3) of addition reaction of a polar group-containing compound with the cyclized poly (conjugated diene) block in the block copolymer obtained in the step (2) thereby introducing the polar group derived from the compound.

The polar group-containing compound is not particularly limited insofar as it is a compound capable of introducing its polar group into the block polymer obtained in the step (2), and preferable examples thereof include ethylenically unsaturated compounds having polar groups such as an acid anhydride group, carboxyl group, hydroxyl group, thiol group, ester group, epoxy group, amino group, amide group, cyano group, silyl group, and halogen.

Examples of the ethylenically unsaturated compound having an acid anhydride group or a carboxyl group include ethylenically unsaturated compounds such as maleic anhydride, itaconic anhydride, aconitic anhydride, norbornene dicarboxylic acid anhydride, acrylic acid, methacrylic acid, and maleic acid. Among which maleic anhydride can be preferably used in respect of reactivity and from an economical viewpoint.

Examples of the ethylenically unsaturated compound containing a hydroxyl group include hydroxyalkyl esters of unsaturated acid, such as 2-hydroxyethyl (meth)acrylate, and 2-hydroxypropyl (meth)acrylate; hydroxyl group-containing unsaturated acid amides such as N-methylol (meth)acrylamide, and N-(2-hydroxyethyl)(meth)acrylamide; polyalkylene glycol monoesters of unsaturated acid, such as polyethylene glycol mono(meth)acrylate, polypropylene glycol mono(meth)acrylate, and poly(ethylene glycol-propylene glycol) mono(meth)acrylate; and polyvalent alcohol monoesters of unsaturated acid, such as glycerol mono(meth) acrylate and the like. Among which the hydroxyalkyl ester of unsaturated acid is preferable, and particularly 2-hydroxyethyl acrylate and 2-hydroxyethyl methacrylate are more preferable.

Examples of the ethylenically unsaturated compound containing other polar group include methyl (meth)acrylate, ethyl (meth)acrylate, butyl (meth)acrylate, glycidyl (meth) acrylate, dimethylaminoethyl (meth)acrylate, dimethylaminopropyl (meth)acrylate, (meth)acrylamide, and (meth)acrylonitrile.

The method of addition reaction of the polar group-containing compound with the cyclized poly (conjugated diene) block to introduce the polar group derived from the compound is not particularly limited, and the addition reaction of the ethylenically unsaturated compound may follow a known reaction generally called ene-addition reaction or graft-polymerization reaction.

This addition reaction is carried out by contact reaction of the polar group-containing compound with the block copolymer having a poly (aromatic vinyl) block and a cyclized poly (conjugated diene) block, if necessary in the presence of a radical generating agent.

Examples of the radical generating agent include peroxides such as di-tert-butylperoxide, dicumylperoxide, benzoylperoxide, tert-butyl peroxide benzoate, and methyl ethyl ketone peroxide; and azonitriles such as azobisisobutyronitrile and the like.

The addition reaction may be conducted in a solid phase state or in a solution state, and is preferably conducted in a solution state to facilitate regulation of the reaction. The reaction solvent used includes, for example, the same solvent as the inert solvent in the cyclization reaction described above.

The amount of the polar group-containing compound used varies depending on reaction conditions, and is selected suitably such that the content of the polar group introduced comes to be in the range described above.

The reaction for introducing the polar group can be conducted under pressure, under reduced pressure or at atmospheric pressure but is conducted desirably at atmospheric pressure from the viewpoint of ease in operation, preferably in a dry stream, more preferably in an atmosphere such as dry nitrogen or dry argon, thereby enabling prevention of side reactions attributable to water.

The reaction temperature and reaction time may be those in accordance with the conventional method, and the reaction temperature is usually 30 to 250° C., preferably 60 to 200° C., and the reaction time is usually 0.5 to 5 hours, preferably 1 to 3 hours.

After the reaction, the reaction solvent or the unreacted polar group-containing compound are removed if desired, to give the polar group-containing block copolymer of the present invention.

Alternatively, the polar group-containing block copolymer of the present invention can be produced by carrying out, before the step (2) of forming the cyclized poly (conjugated diene) block, a step (4) of addition reaction of a polar group-containing compound with the conjugated diene polymer block in the aromatic vinyl-conjugated diene block copolymer obtained in the step (1) to introduce the polar group derived from the compound. The step (4) can be carried out in accordance with the step (3).

If necessary, a coloring agent such as a pigment, dye or the like and additives such as an antioxidant, filler, softening agent, wax or the like can be added to the block copolymer of the present invention. The additives may be those generally used.

Examples of the antioxidant include phenol antioxidants such as 2,6-di-t-butyl phenol, 2,2'-methylene bis(4-methyl-t-butyl phenol), and tetrakis[methylene-3-(3',5'-di-t-butyl-4'-hydroxyphenyl)propionate]methane; amine antioxidants such as phenyl-α-naphthyl amine, diphenyl-p-phenylene diamine, and N-1,3-dimethylbutyl-N'-phenyl-p-phenylene diamine; and phosphorus antioxidants such as tris(nonylphenyl) phosphite and the like.

Examples of the filler include calcium carbonate, calcium oxide, magnesium oxide, calcium hydroxide, magnesium hydroxide, aluminum hydroxide, magnesium carbonate, calcium silicate, barium sulfate, mica, silica, carbon black, talc, clay, titanium dioxide, zinc oxide, glass fiber, and carbon fiber.

The amount of the additives used can be suitably selected for the purpose of formulation and the type of the additives.

The form of the block copolymer can be selected suitably depending on applications, but is usually the form of pellets or powder. To produce such powder, the solid block copolymer may be milled, under cooling, with a mill such as a bantam mill, jet mill, disk mill, ball mill or colloid mill.

The average particle diameter of the powdery particle is usually 1 μm to 200 μm, preferably 3 μm to 100 μm, more preferably 5 μm to 50 μm. The average particle diameter is a particle diameter corresponding to the standard integrated value of 50% particles in a standard integration curve of the numbers of particles against the diameters of the particles, determined by a laser diffraction/light scattering method.

The content of the block copolymer in the powdery particle is usually 5% by weight or more, preferably 10% by weight or more, more preferably 20% by weight or more, still more preferably 30% by weight or more.

The form of the powdery particle is not particularly limited, and is for example spherical or amorphous.

The powdery particle containing the block copolymer of the present invention can be used, for example, as a powdery coating material by virtue of its excellent adhesiveness to polyolefin resin or metal. For use as a powdery coating material, the powdery particle may be blended suitably in a usual manner with a coloring agent and if necessary with an antioxidant, filler, softening agent, wax and the like.

When a pigment is used as the coloring agent, it is preferable to use benzidine-, azo- and isoindoline-pigments for yellow coloration, azo lake-, rhodamine lake-, quinacridone-, naphthol-, and diketopyrrolopyrrole-pigments for magenta coloration, and phthalocyanine- and indanthrene-pigments for cyan coloration. For black coloration, carbon black is usually used. Examples of the carbon black include thermal black, acetylene black, channel black, farness black, lamp black and the like.

When a dye is used as the coloring agent, it is preferable to use azo-, nitro-, quinoline-, quinophthalone-, and methine-dyes for yellow coloration, anthraquinone-, azo-, and xanthene-dyes for magenta coloration, and anthraquinone-, phthalocyanine-, and indoaniline-dyes for cyan coloration.

The amount of the coloring agent used may be selected suitably depending on a desired shade, density or the like, and is preferably 0.1 to 50 parts by weight, more preferably 1 to 20 parts by weight, per 100 parts by weight of the block copolymer.

The powdery coating material can be obtained usually by mixing the block copolymer with the coloring agent and additives to be contained if necessary, then milling the mixture and classifying the milled product.

The mixing method is not particularly limited and examples thereof include a method of melt-mixing with a kneader such as a Banbury mixer, a kneader, a mixing roll, and a single- or twin-screw extruder.

The milling method may follow the above-described method.

Examples of the classification method include air classification, centrifugal classification, and sieve classification.

The block copolymer of the present invention is preferably used by incorporating it as a modifier for polymer molding material into various polymer molding materials made of a thermoplastic resin, a thermosetting resin, or an elastomer, thereby improving the adhesion between a polymer molded product and a coating material or ink, or the adhesion between different polymer films in a laminate. The block copolymer of the present invention is also useful as a modifier for polymer molding material in order to improve the mutual dispersibility of different polymers constituting polymer molding material or the dispersibility, in the polymer, of additives such as a filler, a pigment or the like in polymer molding material.

Examples of the polymer used in polymer molding material as the subject of modification include:
1. The thermoplastic resin such as a hydrocarbon resin, a polyester resin, a polyamide resin, a polyimide resin, a polyurethane resin, a polyether imide resin, a polysulfone resin, a polyether sulfone resin, a polyether ether ketone resin, a polycarbonate resin, a polyvinyl butyrate resin, a polyarylate resin, and a fluorine resin.
2. The thermosetting resin such as a phenol resin, a cresol resin, an urea resin, a melamine resin, an alkyd resin, a furan resin, an unsaturated polyester resin, an epoxy resin, and an urethane resin.
3. The vulcanized rubber such as a natural rubber, a polybutadiene rubber, a styrene-butadiene rubber, and an acrylonitrile-butadiene rubber; and the elastomer such as an olefin thermoplastic elastomer, a styrene thermoplastic elastomer, a polyester thermoplastic elastomer, and a polyamide thermoplastic elastomer.

The modifier for polymer molding material according to the present invention, when incorporated into these resins, particularly into hydrocarbon thermoplastic resins including acyclic olefin resins such as polyethylene, polypropylene, and polypentene-1; and cyclic olefin resins such as addition polymers of ethylene and norbornene, and ring-opening hydrogenated product of norbornene, can exhibit the high modifying effect of the block copolymer.

The polymers described above can be used alone or as a mixture of two or more thereof and can be suitably blended if necessary with a coloring agent such as a pigment and dye and additives such as an antioxidant, filler, softening agent, wax, antistatic agent, stabilizer, lubricant, crosslinking agent, blocking inhibitor, coloring agent, light-shielding agent, UV absorbent or the like.

The amount of the modifier incorporated is suitably selected depending on the type of polymer molding material and its required performance, but is usually 0.1 to 50 parts by weight, preferably 0.5 to 30 parts by weight, more preferably 1 to 20 parts by weight, still more preferably 2 to 10 parts by weight, per 100 parts by weight of the polymer in the polymer molding material.

The block copolymer of the present invention can be used as an adhesive component such as a vehicle component for primer or a binder component for coating material in a primer for the polymer molding material or a coating agent such as a coating material, thereby significantly improving the adhesion between the polymer molding material and the coating material. In this case, the block copolymer is contained in an amount of 2% by weight or more, preferably 5% by weight or more, more preferably 10% by weight or more, relative to the total solid content of a coating agent such as a primer or a coating material.

The block copolymer, when used in a coating agent, is blended if necessary with other adhesive components and various additives.

Examples of the other adhesive component include an acryl resin, an urethane resin, a polyester resin, an epoxy resin, a melamine resin, an alkyd resin, a chlorinated olefin resin, and a silicone rubber.

The ratio of the other adhesive components when incorporated into the block copolymer is suitably selected depending on the type thereof and the incorporating object, and the weight ratio of (the cyclic elastomer):(the other adhesive components) is usually 100:0 to 5:95, preferably 80:20 to 30:70, more preferably 70:30 to 50:50.

The additives can be exemplified by the additives referred to in the modifier as those incorporated into the polymer.

The coating agent containing the block copolymer is obtained usually by dissolving or dispersing the block copolymer or a mixture of the block copolymer and other components in a solvent. The solvent used may be suitably selected, and examples thereof include an aliphatic solvent, an alicyclic solvent, an aromatic hydrocarbon solvent, a ketone solvent, an alcohol solvent, an ether solvent, a halogen solvent and an aqueous solvent. The solvent is used in such an amount that the solid content of the coating agent comes to be in the range of usually 5 to 95% by weight, preferably 15 to 60% by weight.

The coating agent containing the block copolymer of the present invention can also be used as a surface treating agent for dispersed materials such as various fillers and pigments. When dispersed materials are surface-treated with the coating agent, the dispersibility of the dispersed materials in various polymers can be improved.

As the filler and pigment as the subject of surface treatment, those described above can be used. The amount of the block copolymer used is suitably selected depending on the type of dispersed materials and the type of the polymer in which they are dispersed, and the block copolymer is used in an amount of usually 0.1 to 100 parts by weight, preferably 5 to 20 parts by weight, per 100 parts by weight of the dispersed materials.

The block copolymer of the present invention can be used as an adhesive, a primer, or a surface modifier for molded product in various fields such as electric/electronic parts, information recording media, optical parts, mechanical parts, automobile parts, packaging members, civil engineering/building members or the like. The block copolymer of the present invention can be used preferably in electric parts such as liquid crystalline display, plasma display, and organoelectroluminescence display; electronic parts such as circuit board, semiconductor element, and connector; information recording media such as optical disk, magnetic disk, and hard disk; optical parts such as optical lens, optical prism, and optical fiber; automobile parts such as automobile lighting device, display plate for automobile, and exterior/interior materials for automobiles; packaging members such as pharmaceutical container, food container, cosmetic container, tableware, wrapping film, wrapping sheet, and wrapping pack; and civil engineering and building members such as waterproof sheet, water-shielding sheet, and piping material.

(Oxygen Scavenger)

The oxygen scavenger of the present invention comprises the block copolymer as an active ingredient.

The content of the block copolymer in the oxygen scavenger is preferably 10% by weight or more, more preferably 30% by weight or more, still more preferably 50% by weight or more, furthermore preferably 80% by weight or more. When this content is too low, oxygen absorption tends to be lowered.

The oxygen scavenger of the present invention preferably contains a polymer material other than the block copolymer.

The oxygen scavenger of the present invention improves tear strength by incorporating a polymer material other than the block copolymer.

The usable polymer material other than the block copolymer is not particularly limited, and is preferably thermoplastic resin. Various kinds of rubber can also be simultaneously used in the thermoplastic resin.

The polymer materials other than the block copolymer may be used alone or as a mixture of two or more thereof.

The content of the block copolymer in the oxygen scavenger comprising the block copolymer and the polymer material other than the block copolymer is preferably 100 to 10% by weight, more preferably 90 to 20% by weight, still more preferably 85 to 30% by weight, furthermore preferably 80 to 50% by weight. In the range described above, the balance between oxygen absorption and tear strength is kept well, and as the ratio of the block copolymer is increased, oxygen absorption is further improved.

When the content of the block copolymer is nearer to the further more preferable range, the balance between oxygen absorption and tear strength is made excellent.

The thermoplastic resin is not particularly limited, and is preferably at least one member selected from the group consisting of a polyolefin resin, a polyester resin, a polyamide resin and a polyvinyl alcohol resin.

Specific examples of the polyolefin resin include olefin homopolymers such as polyethylene, polypropylene, poly-butene-1, and poly-4-methylpentene-1; copolymers of ethylene and α-olefin, such as an ethylene-propylene random copolymer, an ethylene-propylene block copolymer, an ethylene-propylene-polybutene-1 copolymer, and an ethylene-cyclic olefin copolymer; other ethylene copolymers such as an ethylene-α,β-unsaturated carboxylic acid copolymer, an ethylene-α,β-unsaturated carboxylic acid ester copolymer, an ionically crosslinked product of an ethylene-α,β-unsaturated carboxylic acid copolymer, an ethylene-vinylacetate copolymer, a partially or completely saponified product of an ethylene-vinylacetate copolymer, and the like; and graft-modified polyolefin resin such as polyolefin resin graft-modified with an acid anhydride such as maleic anhydride, and the like.

Specific examples of the polyester resin include polyethylene terephthalate and the like.

Specific examples of the polyamide resin include nylon-6, nylon-6,6, and nylon-6,12.

Specific examples of the polyvinyl alcohol resin include polyvinyl alcohol, a partially or completely saponified product of an ethylene-vinylacetate copolymer, and the like.

Among these thermoplastic resins, the polyolefin resin, particularly an olefin homopolymer and a copolymer of ethylene and α-olefin, are preferable because of their excellent compatibility with the block copolymer.

Rubber which can be used in combination with these thermoplastic resins can be exemplified by natural rubber, polybutadiene rubber, polyisoprene rubber, poly(acrylonitrile-butadiene)rubber, poly(styrene-butadiene)rubber, poly(ethylene-propylene-diene)rubber, acryl rubber, or the like.

The oxygen scavenger of the present invention preferably contains an antioxidant.

As the antioxidant, the same antioxidant as that capable of incorporation into the block copolymer can be used.

The content of the antioxidant in the oxygen scavenger of the present invention is preferably 500 ppm or less, more preferably 400 ppm or less, still more preferably 300 ppm or less. When this content is too high, oxygen absorption tends to be decreased. The lower-limit content of the antioxidant in the oxygen scavenger is preferably 10 ppm, more preferably 20 ppm.

The antioxidant-containing oxygen scavenger is excellent in processability during extrusion molding to easily form a smooth film and does not reduce mechanical strength during molding.

To obtain the antioxidant-containing oxygen scavenger, the antioxidant may be previously added to the block copolymer used as the starting material, or the antioxidant may be incorporated at the time of preparation of the oxygen scavenger.

Insofar as the effect of the invention is substantially not inhibited, the oxygen scavenger of the present invention may contain additives such as a catalyst having an action of enhancing oxygen absorption, a photo-initiator, heat stabilizer, reinforcing agent, filler, flame retardant, coloring agent, plasticizer, UV absorber, lubricant, drying agent, deodorant, flame retardant, antistatic agent, surface tack eliminator, antifogging agent, surface treating agent and the like.

Depending on the object, these additives can be suitably selected from those known in the field of oxygen scavenger and incorporated in a suitable amount.

The method of incorporating the additives is not particularly limited, and can be carried out by melt-kneading the respective components constituting the oxygen scavenger or by mixing the components in the form of a solution and then removing its solvent.

A typical example of the catalyst having an action of enhancing oxygen absorption is a transition metal salt. The oxygen scavenger of the present invention exhibits sufficient oxygen absorption even without containing the transition metal salt, but is made further excellent in oxygen absorption by incorporating the transition metal salt.

Examples of the transition metal salt include transition metal salts illustrated in Japanese Patent Application National Publication (Laid-Open) No. 2001-507045, JP-A No. 2003-71992, and Japanese Patent Application National Publication (Laid-Open) No. 2003-504042, and are preferably cobalt(II) oleate, cobalt(II) naphthenate, cobalt(II) 2-ethylhexanoate, cobalt (II) stearate, cobalt (II) neodecanoate or the like, among which cobalt(II) 2-ethylhexanoate, cobalt(II) stearate and cobalt (II) neodecanoate are more preferable.

The amount of the transition metal salt incorporated is usually 10 to 10,000 ppm, preferably 20 to 5,000 ppm, more preferably 50 to 5,000 ppm, based on the total amount of the oxygen scavenger.

The photo-initiator is an initiator which upon irradiation of the oxygen scavenger with energy rays, has an action of promoting the initiation of oxygen absorption reaction.

Examples of the photo-initiator include benzophenones, acetophenones, and anthraquinones illustrated in Japanese Patent Application National Publication (Laid-Open) No. 2003-504042.

The amount of the photo-initiator when incorporated into the oxygen scavenger is usually 0.001 to 10% by weight, preferably 0.01 to 1% by weight, based on the total amount of the oxygen scavenger.

The form of the oxygen scavenger of the present invention is not particularly limited, and the oxygen scavenger can be used in various forms, for example in the form of film, sheet, pellet or powder. The shapes of pellet and powder are not particularly limited either. Preferably, the oxygen scavenger is used particularly in the form of sheet, film or powder to increase the surface area thereof per unit weight and improve oxygen absorption rate, and more preferably in the form of film or powder.

The thickness of the film-shaped oxygen scavenger is usually 10 μm or more and less than 250 μm, and the thickness of the sheet-shaped oxygen scavenger is usually 250 μm or more and less than 3 mm.

The number-average particle diameter of the powder is usually 1 to 1,000 μm, preferably 10 to 500 μm.

The method of forming the oxygen scavenger of the present invention in a desired form is not particularly limited, and methods known in the art can be used.

In the case of the sheet or film, the sheet- or film-shaped oxygen scavenger can be formed for example by a casting method or by extrusion-molding through a die of predetermined shape, such as T-die, circular die or the like by a melt extruder such as a single- or multi-screw melt extruder. As a matter of course, a compression molding method, injection molding method or the like can also be used.

In the case of the powder, the powdery oxygen scavenger can be obtained for example by milling the oxygen scavenger in a temperature atmosphere below the Tg of the block copolymer contained in the oxygen scavenger.

Further, a blow molding method, injection molding method, vacuum forming method, pressure forming method, stretch forming method, preg-assist molding method, powder molding or the like can be used for molding into a desired shape.

When the oxygen scavenger of the present invention is used, it can be irradiated with an energy ray to promote the initiation of oxygen absorption reaction or increase the rate of absorption of oxygen. As the energy ray, it is possible to use, for example, a visible ray, UV ray, X ray, electron ray, γ ray or the like. The amount of irradiation energy can be suitably selected depending on the type of energy ray used.

The oxygen scavenger of the present invention can be used preferably as an oxygen scavenger in products easily deteriorated in the presence of oxygen, for example drinks such as beer, wine, fruits juice, carbonate soft drink or the like; foods such as fruits, nuts, vegetables, meat products, infant foods, coffee, jam, mayonnaise, ketchup, edible oil, dressings, sauces, food boiled in soy sauce, dairy products or the like; and pharmaceutical preparations, electronic parts, recording media, cosmetics, gasoline or the like.

EXAMPLES

Hereinafter, the present invention is described in more detail by reference to the Examples. In the following description, "parts" and "%" are expressed on a weight basis unless otherwise specified.

(1) Weight-average Molecular Weight of the Polymer

The weight-average molecular weight of the polymer is determined as a standard polystyrene-equivalent molecular weight by gel permeation chromatography.

(2) Degree of Cyclization

The peak area (A) of proton derived from double bond of the conjugated diene polymer block moiety of the aromatic vinyl-conjugated diene block polymer used as the starting material is determined by $^1$H-NMR analysis. Then, the peak area (B) of proton derived from double bond of the cyclized poly (conjugated diene) block moiety of the block copolymer after cyclization reaction is determined by $^1$H-NMR analysis. From the above-mentioned (A) and (B), the degree of cyclization is determined from the following equation:

$$\text{Degree of cyclization}(\%) = \frac{(A) - (B)}{(A)} \times 100$$

In the case of the conjugated diene polymer-cyclized product, the peak area (A) of proton derived from double bond of the conjugated diene polymer used as the starting material and the peak area (B) of proton derived from double bond in the cyclized product thereof are determined by $^1$H-NMR analysis, and the degree of cyclization (%) is determined from the equation above.

(3) Styrene Unit Content

The styrene unit content (%) in the polymer is determined by $^1$H-NMR analysis.

(4) Content of Polar Groups in the Polymer

By Fourier transform infrared absorption spectrum analysis, the intensity of a peak (1760 to 1780 cm$^{-1}$) of acid anhydride groups is measured to determine the content of acid anhydride group by a calibration curve method. Similarly, the intensity of a peak (1700 cm$^{-1}$) of carboxyl groups is measured to determine the content of carboxyl group by a calibration curve method.

(5) Peel Strength of a Coating Film

In the surface of a polymer-molded product coated with a coating material, two cut lines whose depth reaches a polymer base material are produced by a cutter blade at 1 cm intervals. After peeling the edge of the coating film, the edge of the peeled coating film is drawn in a direction of 180° C. at a stress rate of 50 mm/min. until the coating film is peeled off, to determine peel strength (unit: kgf/cm).

(6) Consumption Degree of Unsaturated Bond in the Block Copolymer

The consumption degree of unsaturated bond is determined by proton NMR measurement with reference to methods described in the following literatures (i) and (ii):

(i) M. a. Goluband J. Heller, Can. J. Chem., 41, 937 (1963).
(ii) Y. Tanaka and H. Sato, J. Polym. Sci: Poly. Chem. Ed., 17, 3027 (1979).

Assuming that in the conjugated diene monomer unit moiety in the conjugated diene polymer, the peak area of total protons before the cyclization reaction is SBT, the peak area of proton bound directly to double bond before the cyclization reaction is SBU, the peak area of total protons after the cyclization reaction is SAT, and the peak area of proton bound directly to double bond after the cyclization reaction is SAU, the peak area ratio (SB) of proton bound directly to double bond before the cyclization reaction is as follows:

$SB=SBU/SBT$, and the peak area ratio (SA) of proton bound directly to double bond after the cyclization reaction is as follows:

$SA=SAU/SAT$.

Accordingly, the consumption degree of unsaturated bond is determined according to the following equation:

Consumption degree of unsaturated bond (%)=100×$(SB-SA)/SB$ (7) Content of Acid Anhydride Groups or Carboxyl Groups in the Acid Anhydride Group- or Carboxyl Group-Containing Block Copolymer By Fourier transform infrared absorption spectrum analysis, the intensity of a peak (1760 to 1780 $cm^{-1}$) of acid anhydride groups and the intensity of a peak (1700 $cm^{-1}$) of carboxyl groups are measured to determine the content of acid anhydride group and carboxyl group by a calibration curve method. The content (millimole) per 100 g of the whole of the polymer is shown.

(8) Amount of Oxygen Absorbed by the Film-Shaped Oxygen Scavenger

Together with 200 ml air, the film-shaped oxygen scavenger is sealed in a bag comprising 3 layers, that is, an outer layer of polyethylene terephthalate film (PET) of 12 μm in thickness/intermediate layer of aluminum foil (Al) of 20 μm in thickness/inner layer of polyethylene film (PE) of 30 μm in thickness. The bag is left at 25° C. for a predetermined time, and then the concentration of oxygen in the bag is measured with an oxygen meter (oxygen analyzer HS-750 manufactured by Neutronics). From this result, the volume of oxygen absorbed per day by 1 $m^2$ (surface area equivalent) of the film-shaped oxygen scavenger is determined.

(9) Tensile Strength of the Film-Shaped Oxygen Scavenger

The film-shaped oxygen scavenger of 100 to 120 μm in thickness is extended at the rate of 50 mm/min. according to JIS K 7127, to determine the tensile strength of the film-shaped oxygen scavenger.

The tensile strength of the film-shaped oxygen scavenger is measured before the oxygen scavenger absorbs oxygen and when the oxygen scavenger has absorbed oxygen in an amount corresponding to 5% of the weight of the oxygen scavenger, and the degree of retention of the tensile strength, that is, the ratio of the tensile strength of the latter to the tensile strength of the former, is determined, and the tensile strength is judged under the following criteria:

◯: The degree of retention is higher than 70%.
Δ: The degree of retention is 50 to 70%.
x: The degree of retention is lower than 50%.

(10) Amount of Oxygen Absorbed by the Powdery Oxygen Scavenger

Together with 200 ml air, the powdery oxygen scavenger is sealed in a bag comprising 3 layers, that is, an outer layer of polyethylene terephthalate film (PET) of 12 μm in thickness/intermediate layer of aluminum foil (Al) of 20 μm in thickness/inner layer of polyethylene film (PE) of 30 μm in thickness. The bag is left at 30° C. for a predetermined time, and then the concentration of oxygen in the bag is measured with an oxygen meter (oxygen analyzer HS-750 manufactured by Neutronics). From this result, the volume of oxygen absorbed per day by 1 g of the powdery oxygen scavenger is determined.

(11) Tear Strength of the Film-Shaped Oxygen Scavenger

According to JIS K7128-3, test pieces each having a thickness of 100 μm are measured at 23° C. with a testing machine Instron 5566 (manufactured by Instron Corporation) and the number of the measured piece is 5 (n=5).

Example 1

Charged were 8000 g of cyclohexane, 320 g of styrene, and 19.9 millimoles of n-butyl lithium (1.56 mol/L solution dissolved in hexane) into an autoclave equipped with a stirrer, then heated to an internal temperature of 60° C., and polymerized for 30 minutes. The degree of polymerization conversion of styrene was almost 100%. A part of the polymerization solution was collected and measured to indicate that the weight-average molecular weight of the resulting polystyrene was 14,800.

Then, 1840 g of isoprene was added continuously thereto over 60 minutes while the internal temperature was regulated so as not to exceed 75° C. After the addition was finished, the mixture was further reacted at 70° C. for 1 hour. The degree of polymerization conversion at this stage was almost 100%.

Then, 0.362 g of 1% aqueous solution of a sodium salt of a β-naphthalene sulfonic acid-formalin condensate was added to the polymerization solution described above to terminate the polymerization reaction to give a block copolymer a of diblock structure comprising a polystyrene block and a polyisoprene block. A part of this solution was collected and measured to indicate that the weight-average molecular weight was 178,000.

Subsequently, 18.4 g of xylene sulfonic acid was added to the above polymer solution and the mixture was subjected to cyclization reaction at 80° C. for 4 hours. Thereafter, 25% aqueous sodium carbonate solution containing 6.2 g sodium carbonate was added thereto to terminate the cyclization reaction, and the reaction mixture was stirred at 80° C. for 30 minutes. The resulting polymer solution was filtered with a glass fiber filter having a pore diameter of 1 μm to remove the cyclization catalyst residues, whereby a solution containing a block copolymer A was obtained.

Added was 0.21 part of IRGANOX 565 (manufactured by Ciba Specialty Chemicals) as an antioxidant to 1000 parts of this solution and then stirred at 120° C. to distill the solvent away, and when the solid content became 85% by weight, the mixture was heated to 160° C., followed by complete removal of the solvent under reduced pressure, to give block copolymer A.

The styrene unit content, the degree of cyclization, and the weight-average molecular weight of the block copolymer A were measured. The results are shown in Table 1. The consumption degree of unsaturated bond is also shown in Table 1.

Example 2

While 1000 parts of the block copolymer A containing solution obtained in Example 1 were stirred, the solvent was distilled away at 120° C. until the solid content became 80% by weight. Then, 4.41 parts of maleic anhydride was added to this solution, and the mixture was subjected to addition reaction at 160° C. for 1 hour. Thereafter, the unreacted maleic anhydride and the solvent were removed at 160° C., and 0.42 part of IRGANOX 565 (manufactured by Ciba Specialty Chemicals) was added as an antioxidant, and then the reaction solution was cast in a container coated with an ethylene tetra fluoride resin coating. The reaction solution was dried at 75° C. under reduced pressure to give maleic anhydride-added block copolymer B.

The styrene unit content, the degree of cyclization, the polar group content, and the weight-average molecular weight of the block copolymer B were measured. The results are shown in Table 1. The consumption degree of unsaturated bond is also shown in Table 1.

Example 3

Charged were 1700 g of toluene, 192 g of styrene, and 19.5 millimoles of n-butyl lithium (1.56 mol/L solution dissolved in hexane) into an autoclave equipped with a stirrer, then heated to an internal temperature of 60° C., and polymerized for 60 minutes. The degree of polymerization conversion of styrene was almost 100%. A part of the polymerization solution was collected and measured to indicate that the weight-average molecular weight of the resulting polystyrene was 9,500.

Then, 537 g of isoprene was added continuously thereto over 60 minutes while the internal temperature was regulated so as not to exceed 75° C. After the addition was finished, the mixture was further reacted at 60° C. for 1 hour. The degree of polymerization conversion at this stage was almost 100%.

Then, 9.6 millimoles of p-dibromobenzene was added thereto and the mixture was subjected to coupling reaction for 180 minutes to give a block copolymer c having a tri-block structure of styrene-isoprene-styrene.

A part of the resulting polymer solution was collected and measured to indicate that the weight-average molecular weight of the block copolymer c was 105,000.

Subsequently, 4.3 g p-toluene sulfonic acid was added to the above polymer solution and the mixture was subjected to cyclization reaction at 80° C. for 3 hours. Thereafter, 25% aqueous sodium carbonate solution containing 1.6 g sodium carbonate was added thereto to terminate the cyclization reaction, and the mixture was stirred at 80° C. for 30 minutes. The resulting polymer solution was filtered with a glass fiber filter having a pore diameter of 1 μm to remove the cyclization catalyst residues, whereby a solution containing a cyclization product of the block copolymer c was obtained.

While this solution was stirred at 160° C., toluene was distilled away until the solid content became 80%. Then, 13.43 g maleic anhydride was added to this solution, and the mixture was subjected to addition reaction at 160° C. for 1 hour. Thereafter, the unreacted maleic anhydride and the solvent were removed at 160° C., and 1.46 g IRGANOX 565 (manufactured by Ciba Specialty Chemicals) was added as an antioxidant, and then the reaction solution was cast in a container coated with an ethylene tetra fluoride resin coating. The reaction solution was dried at 75° C. under reduced pressure to give maleic anhydride-added block copolymer C.

The styrene unit content, the degree of cyclization, the polar group content, and the weight-average molecular weight of the block copolymer C were measured. The results are shown in Table 1. The consumption degree of unsaturated bond is also shown in Table 1.

Comparative Example 1

While 1000 parts of the block copolymer a solution (solid content=20.9%) obtained in Example 1 were stirred, the solvent was distilled away at 120° C. until the solid content became 80% by weight. Then, 4.41 parts of maleic anhydride was added to this solution, and the mixture was subjected to addition reaction at 160° C. for 1 hour. Thereafter, the unreacted maleic anhydride and the solvent were removed at 160° C., and 0.42 part of IRGANOX 565 (manufactured by Ciba Specialty Chemicals) was added as an antioxidant, and then the reaction solution was cast in a container coated with an ethylene tetra fluoride resin coating. The reaction solution was dried at 75° C. under reduced pressure to give maleic anhydride-added block copolymer D.

The styrene unit content, the degree of cyclization, the polar group content, and the weight-average molecular weight of the block copolymer D were measured. The results are shown in Table 1. The consumption degree of unsaturated bond is also shown in Table 1.

Comparative Example 2

According to Example 2 in JP-A No. 2003-192725, the following experiment was carried out.

Charged were 100 parts of polyisoprene (73% cis-1,4-structure isoprene unit, 22% trans-1,4-structure isoprene unit, 5% 3,4-structure isoprene unit, weight-average molecular weight=107,000) cut into pieces 10 by 10 mm square and 1570 parts of toluene into a four-necked flask equipped with a stirrer, a thermometer, a reflux condenser and a nitrogen gas introducing tube. After the atmosphere in the flask was replaced by nitrogen, the mixture was heated on an oil bath at 85° C. and stirred to dissolve the polyisoprene in toluene. After the mixture was completely dissolved, 3.6 parts of p-toluene sulfonic acid were added thereto, and the solution was subjected to cyclization reaction under stirring at a temperature kept at 85° C. After 5 hours, 400 parts of deionized water were introduced to terminate the cyclization reaction.

After the reaction solution was left for 30 minutes, the oil phase was washed 3 times with 400 parts of deionized water and then centrifuged at a revolution number of 300 rpm to remove the water. The oil phase was further heated at 130° C. to remove the water completely.

While the toluene solution containing the cyclization product thus obtained was stirred, 2 parts of maleic anhydride were introduced at a constant rate over 5 minutes. The mixture was subjected to addition reaction for 4 hours at a reaction temperature of 160° C., and the reaction solution was introduced into 3000 parts of acetone containing 1% of 2,6-di-tert-butyl phenol to collect precipitates. The precipitates were dried under reduced pressure to give a polyisoprene-cyclized product to which maleic anhydride had been added.

The degree of cyclization, the polar group content and the weight-average molecular weight of this polyisoprene-cyclized product were measured. The results are shown in Table 1. The consumption degree of unsaturated bond is also shown in Table 1.

The block copolymers A to D and the polyisoprene-cyclized product obtained in the experiments described above were those substantially not containing gel insoluble in toluene.

TABLE 1

|  | Examples | | | Comparative Examples | |
|---|---|---|---|---|---|
|  | 1 | 2 | 3 | 1 | 2 |
| Block copolymer | A | B | C | D | polyisoprene-cyclized product |
| Weight-average molecular weight | 132,500 | 137,400 | 78,300 | 178,000 | 73,000 |
| Weight-average molecular weight of polystyrene block moiety | 14,800 | 14,800 | 9,500 | 14,800 | — |
| Styrene unit content (%) | 15 | 15 | 25 | 15 | — |
| Degree of cyclization (%) | 75 | 76 | 78 | 0 | 78 |
| Consumption degree of unsaturated bond (%) | 61 | 61 | 63 | 0 | 63 |
| Polar group content (millimole/100 g) | — | 21 | 17 | 22 | 18 |
| Acid anhydride group | — | 17 | 15 | 18 | 16 |
| Carboxyl group | — | 4 | 2 | 4 | 2 |

Example 4 and Comparative Example 3

Preparation of Primers and Evaluation Thereof

The block copolymer A and the polyisoprene-cyclized product were used as the binder resin, and according to the primer formulation shown in Table 2, the ingredients were mixed by a high-speed stirrer (Disper) for 10 minutes and then diluted with toluene such that the fluidity of the dilution became 13 to 14 seconds in terms of dropping time, to prepare two kinds of primers.

The dropping time is time measured at 20° C. in accordance with Ford Cup Method No. 4 prescribed in JIS K 5400.

TABLE 2

|  | Examples 4 | Comparative Examples 3 |
|---|---|---|
| Primer formulation | | |
| Block copolymer A | 20 | — |
| Polyisoprene-cyclized product | — | 20 |
| Titanium oxide | 15 | 15 |
| Xylene | 80 | 80 |
| Peel strength (Kgf/cm) | | |
| Molded plate X | 7.1 | 5.6 |
| Molded plate Y | 8.5 | 6.1 |
| Molded plate Z | 7.9 | 6.0 |

Using the resin materials shown in Table 3, three kinds of resin molded plates X to Z (thickness 3 mm×width mm×length 80 mm) were produced by extrusion molding.

TABLE 3

| Test piece | Resin constituting the test piece |
|---|---|
| Molded plate X | Polypropylene Resin J-3054HP (manufactured by Idemitsu Petrochemical Co., Ltd.) (MFR = 42 g/10 min) |
| Molded plate Y | a. Polypropylene Resin J-3045HP (manufactured by Idemitsu Petrochemical Co., Ltd.)/b. Ethylene/butene-1 copolymer EBM3021 (manufactured by JSR)/c. Talc JM-209 (manufactured by ASADA MILLING CO., LTD.) a/b/c = 70/23/7 |
| Molded plate Z | Hydrogenated product of ring-opened polymer made of 15% by weight ethyltetracyclododecene unit and 85% by weight dicyclopentadiene unit; Tg, 103° C.; degree of hydrogenation, 99% or more |

The prepared molded plates X to Z were washed sufficiently with water. Each primer in Table 2 was spray-coated onto the molded plate by a spray gun with an aperture of 1.0 mm at a spray pressure of 3.5 to 5.0 MPa, to form a coating film of 10 μm in thickness on the molded plate. After drying for 5 minutes, a two-component curing urethane metallic coating material (trade name RB-212 (base coating material) and trade name RB-288 (clear coating material) manufactured by NIPPON BEE CHEMICAL CO., LTD.) was 2-coat coated on the primer layer by the same spray gun as above to be 70 μm in thickness. After drying for 15 minutes at 23° C., the coating film was dried at 80° C. for 30 minutes in a non-circulatory drying oven. After drying for 3 days at room temperature, the peel strength of the coating film was measured. The results are shown in Table 2.

As can be seen from Table 2, the block copolymer of the present invention can be used as a binder component in a primer to improve the adhesion between the various polymer base materials and the coating film.

Example 5 and Comparative Examples 4 and 5

Preparation of Resin Compositions and Evaluation Thereof

The propylene resin composition shown in Table 4 was mixed by a Henschel mixer, then introduced into at win-screw extruder (35 mmφ), and kneaded at 200° C. at 200 rpm to give pellets of each composition. Then, the pellets were compression-molded to give a test molded piece (thickness 3 mm×width 50 mm×length 80 mm).

Ale;2q two-component curing urethane metallic coating material (trade name RB-212 (base coating material) and trade name RB-288 (clear coating material) manufactured by NIPPON BEE CHEMICAL CO., LTD.) was 2-coat coated on the surface of this test piece by the same spray gun as above to be 50 μm in thickness. After drying for 15 minutes at 23° C., the coating film was dried at 80° C. for 30 minutes in a non-circulatory drying oven. After drying for 3 days at room temperature, the peel strength of the coating film was measured. The results are shown in Table 4.

TABLE 4

|  | Examples 5 | Comparative Examples 4 | 5 |
|---|---|---|---|
| Resin composition |  |  |  |
| Polypropylene resin (J-3054HP, manufactured by Idemitsu Petrochemical Co., Ltd.) | 90 | 100 | 90 |
| Block copolymer C | 10 | — | — |
| Polyisoprene-cyclized product | — | — | 10 |
| Aging inhibitor | 0.1 | 0.1 | 0.1 |
| Peel strength of the coating film (kgf/cm) | 6.2 | 0.9 | 3.9 |

As can be seen from Table 4, the resin molded product incorporated with the block copolymer of the present invention is excellent in adhesion to the coating film applied onto the surface thereof.

Examples 6 and 7 and Comparative Examples 6 and 7

Laminate Adhesion of Different Films

Applied was 10% toluene solution of the polymer shown in Table 5 by a wire bar onto a bi-oriented stretched polypropylene film (Sun Orient PB-260 (thickness 25 μm) manufactured by Futamura Chemical Co., Ltd.) such that the thickness of the resulting film after drying became 1 to 2 μm. Thereafter, the toluene was evaporated with a hot-air dryer.

The resulting film was laminate-bonded to a film shown in Table 5 by a hot roll laminator set at 120° C. (EXCELAM II 355Q, manufactured by Education Products Services Ltd.). After left for 1 hour, the resulting multilayer film was cut into rectangular strips of 15 mm in width to measure adhesion strength (g/15 mm).

This adhesion strength is expressed in terms of the maximum stress under which the bonded multilayer film was extended at the rate of 50 mm/min.

TABLE 5

|  | Examples | | Comparative Examples | |
|---|---|---|---|---|
|  | 6 | 7 | 6 | 7 |
| Polymer | Block copolymer A | Block copolymer B | Block copolymer D | Polyisoprene-cyclized product |
| Adhesion strength (g/15 mm) |  |  |  |  |
| Non-stretched polypropylene film (FP (thickness 25 mm) manufactured by Futamura Chemical Co., Ltd.) | 120 | 80 | 60 | 70 |
| Bi-oriented stretched polyamide film (Uniron G-100#25 manufactured by Idemitsu United Co., Ltd.) | 85 | 110 | 50 | 65 |

As can be seen from Table 5, the block copolymer of the present invention can be used to improve the laminate adhesion between different films.

Example 8

Preparation of Powdery Coating Material and Evaluation Thereof

Melt-kneaded were 100 parts of block copolymer A and 6 parts of copper phthalocyanine cyan pigment (Heliogen Blue S7084 manufactured by BASF) by a plastomill, and then the resulting solids were milled with a jet mill. The milled product was air-classified to give a powdery coating material of cyan color having an average particle diameter of 30 μm.

The average particle diameter of the powdery particle was measured by using a laser diffraction/scattering particle size distribution measuring meter (LMS-300 manufactured by SEISHIN ENTERPRISE CO., LTD.). In this measurement, the average particle diameter is indicated by a particle diameter corresponding to the standard integrated value of 50% particles in a standard integration curve of the numbers of particles against the diameters of the particles.

The resulting powdery coating material was coated onto a steel plate treated with zinc phosphate, to give a coating film of 50 to 60 μm thereon, and then heated and baked for 20 minutes in an oven at 200° C.

The resulting coating film surface was smooth, and when the adhesion of this coating film was measured by a cross cut test, the result was 100/100 indicating excellent adhesiveness.

The cross cut test was carried out in the following manner.

In the coated surface of the test piece, 11 cut lines whose depth reaches the base were made at 2-mm intervals lengthwise and breadth wise respectively to form 100 crosscut squares each having a size of 2 mm×2 mm. A cellophane adhesive tape was stuck on the coated surface and peeled off forming an angle of 45° to test surface, to determine the number of remaining crosscut squares on the surface.

From the above results, it was found the powdery particle containing the block copolymer of the present invention and a coloring agent, when used as a powdery coating material, give a coating film excellent in adhesion to the base material.

Production Example 1

Production of Block Copolymer E

Charged were 8000 g of cyclohexane, 320 g of styrene, and 19.9 millimoles of n-butyl lithium (1.56 mol/L solution dissolved in hexane) into an autoclave equipped with a stirrer, then heated to an internal temperature of 60° C., and polymerized for 30 minutes. The degree of polymerization conversion of styrene was almost 100%. A part of the polymerization solution was collected and measured to indicate that the weight-average molecular weight of the resulting polystyrene was 14,800.

Then, 1,840 g of isoprene was added continuously thereto over 60 minutes while the internal temperature was regulated so as not to exceed 75° C. After the addition was finished, the mixture was further reacted at 70° C. for 1 hour. The degree of polymerization conversion at this stage was almost 100%.

Then, 0.362 g of 1% aqueous solution of a sodium salt of a β-naphthalene sulfonic acid-formalin condensate was added to the polymerization solution described above to terminate the polymerization reaction to give a styrene-isoprene block copolymer e of di-block structure comprising a polystyrene block and a polyisoprene block. A part of this solution was collected and measured to indicate that the weight-average molecular weight was 178,000.

Subsequently, 18.4 g of xylene sulfonic acid was added to the above polymer solution and the mixture was subjected to cyclization reaction at 70° C. for 4 hours. Thereafter, 25% aqueous sodium carbonate solution containing 6.55 g sodium carbonate was added thereto to terminate the cyclization reaction, and the reaction mixture was stirred at 80° C. for 30 minutes. The resulting polymer solution was filtered with a glass fiber filter having a pore diameter of 1 μm to remove the cyclization catalyst residues, whereby a solution containing a block copolymer E was obtained.

Added was 0.105 part of pentaerythritol tetrakis[3-(3,5-di-t-butyl-4-hydroxyphenyl)propionate] (trade name: IRGANOX 1010, manufactured by Ciba Specialty Chemicals) as an antioxidant to 1,000 parts of this solution and then stirred at 120° C. to distill the solvent away, and when the solid content became 85% by weight, the mixture was heated to 200° C., followed by completely removing the solvent under reduced pressure, to give a block copolymer E.

The styrene unit content, the consumption degree of unsaturated bond, and the weight-average molecular weight of the block copolymer E were measured. The results are shown in Table 6. The degree of cyclization is also shown in Table 6.

Production Example 2

Production of Block Copolymer F

While 1,000 parts of the block copolymer E containing solution obtained in Production Example 1 were stirred, the solvent was distilled away at 120° C. until the solid content became 80% by weight. Then, 5.25 parts of maleic anhydride was added to this solution, and the mixture was subjected to addition reaction at 160° C. for 1 hour. Thereafter, the unreacted maleic anhydride and the solvent were removed at 160° C., and 0.105 part of pentaerythritol tetrakis [3-(3,5-di-t-butyl-4-hydroxyphenyl) propionate] (tradename: IRGANOX 1010, manufactured by Ciba Specialty Chemicals) was added as an antioxidant, and then the reaction solution was cast in a container coated with an ethylene tetra fluoride resin coating. The reaction solution was dried at 75° C. under reduced pressure to give a maleic anhydride-added block copolymer F.

The styrene unit content, the consumption degree of unsaturated bond, the polar group content, and the weight-average molecular weight of the block copolymer F were measured. The results are shown in Table 6. The degree of cyclization is also shown in Table 6.

Production Example 3

Production of Block Copolymer g

While 1,000 parts of the styrene-isoprene block copolymer e solution (solid content=20.9%) obtained in Production Example 1 were stirred, the solvent was distilled away at 120° C. until the solid content became 80% by weight. Then, 5.23 parts of maleic anhydride was added to this solution, and the mixture was subjected to addition reaction at 160° C. for 1 hour. Thereafter, the unreacted maleic anhydride and the solvent were removed at 160° C., and 0.105 part of pentaerythritol tetrakis[3-(3,5-di-t-butyl-4-hydroxyphenyl)propionate] (trade name: IRGANOX 1010, manufactured by Ciba Specialty Chemicals) was added as an antioxidant, and then the reaction solution was cast in a container coated with an ethylene tetra fluoride resin coating. The reaction solution was dried at 75° C. under reduced pressure to give a maleic anhydride-added block copolymer g.

The styrene unit content, the consumption degree of unsaturated bond, the polar group content, and the weight-average molecular weight of the block copolymer g were measured. The results are shown in Table 6. The degree of cyclization is also shown in Table 6.

TABLE 6

|  | Production Examples | | |
|---|---|---|---|
|  | 1 | 2 | 3 |
| Block copolymer | — | — | g |
| Block copolymer-cyclized product | E | F | — |
| Weight-average molecular weight | 132,500 | 137,400 | 178,000 |
| Weight-average molecular weight of polystyrene block moiety | 14,800 | 14,800 | 14,800 |
| Styrene unit content (%) | 15 | 15 | 15 |
| Consumption degree of unsaturated bond (%) | 61 | 61 | 0 |
| Degree of cyclization (%) | 75 | 76 | 0 |
| Polar group content (millimole/100 g) | — | 21 | 22 |
| Acid anhydride group | — | 17 | 18 |
| Carboxyl group | — | 4 | 4 |

Example 9

The block copolymer E was compression-molded at 120° C. in a nitrogen atmosphere to prepare a film-shaped oxygen scavenger 1 of 120 μm in thickness. Together with 200 mL air, the film-shaped oxygen scavenger 1 of 120 μm in thickness cut in a size of 100 mm×100 mm was sealed in a bag having a size of 150 mm×220 mm comprising 3 layers, that is, an outer layer of polyethylene terephthalate film (PET) of 12 μm in thickness/intermediate layer of aluminum foil (Al) of 20 μm in thickness/inner layer of polyethylene film (PE) of 30 μm in thickness. The bag was left at 25° C. for 1 day and then the concentration of oxygen in the bag was measured with an oxygen meter. From this result, the amount of oxygen absorbed by the film-shaped oxygen scavenger 1 was determined. The result is shown in Table 7. The tensile strength of the film-shaped oxygen scavenger before and after oxygen absorption was measured to determine the degree of retention of the tensile strength. The result is shown in Table 7. The measured tear strength of the film-shaped oxygen absorber was 95.9 N/mm.

Example 10

A film-shaped oxygen scavenger 2 was obtained in the same manner as in Example 9 except that the block copolymer F was used in place of the block copolymer E. The amount of oxygen absorbed and the degree of retention of tensile strength were measured in the same manner as in Example 9. The results are shown in Table 7.

Example 11

Prepared was 30% solution of the block copolymer E in toluene under a nitrogen atmosphere. Cobalt neodecanoate was added thereto in such an amount that the amount of cobalt metal became 200 ppm relative to the block copolymer E. A part of the toluene was distilled away from this solution which was then dried under reduced pressure to remove the toluene thereby giving an oxygen scavenger 3 comprising the block copolymer E containing cobalt neodecanoate.

The amount of oxygen absorbed and the degree of retention of tensile strength were measured in the same manner as in Example 9 except that the oxygen scavenger 3 was used in place of the oxygen scavenger 1. The result is shown in Table 7.

Example 12

An oxygen scavenger 4 was obtained in the same manner as in Example 11 except that the block copolymer F was used in place of the block copolymer E.

The amount of oxygen absorbed and the degree of retention of tensile strength were measured in the same manner as in Example 9 except that the oxygen scavenger 4 was used in place of the oxygen scavenger 1. The result is shown in Table 7.

Example 13

The block copolymer E, and polypropylene (PP) having a melt flow rate (MFR) of 6.4 (F-744NP, manufactured by Idemitsu Petrochemical Co., Ltd.), were mixed in a ratio of 80/20 by a Henschel mixer, then melt-kneaded by a twin-screw extruder set at 210° C., and pelleted to prepare a polymer mixture. The pellets were formed into a sheet by an electrically heated roll at 180° C. and then compression-molded at 160° C. to prepare a film-shaped oxygen scavenger 5 of 120 μm in thickness. Together with 200 mL air, the film-shaped oxygen scavenger 5 cut in a size of 100 mm×100 mm was sealed in a bag having a size of 150 mm×220 mm comprising 3 layers, that is, an outer layer of polyethylene terephthalate film (PET) of 12 μm in thickness/intermediate layer of aluminum foil (Al) of 20 μm in thickness/inner layer of polyethylene film (PE) of 30 μm in thickness. The bag was left at 25° C. for 1 day and then the concentration of oxygen in the bag was measured with an oxygen meter. From this result, the amount of oxygen absorbed by the film-shaped oxygen scavenger 5 was determined. The tensile strength of the film-shaped oxygen scavenger before and after oxygen absorption was measured to determine the degree of retention of the tensile strength. These results are shown in Table 7. The measured tear strength of the film-shaped oxygen absorber was 159.5 N/mm, which is superior to Example 9. This is an effect achieved by mixing PP.

Example 14

The block copolymer E, and polyethylene (PE) having an MFR of 2.0 (LLDPE 0234, manufactured by Idemitsu Petrochemical Co., Ltd.), were mixed in a ratio of 45/55 by a Henschel mixer, then melt-kneaded with a twin-screw extruder set at 200° C., and pelleted to prepare a polymer mixture. The pellets were formed into a sheet by an electrically heated roll at 180° C. and then compression-molded at 160° C. to prepare a film-shaped oxygen scavenger 6 of 120 μm in thickness. Together with 200 mL air, the film-shaped oxygen scavenger 6 cut in a size of 100 mm×100 mm was sealed in a bag having a size of 150 mm×220 mm comprising 3 layers, that is, an outer layer of polyethylene terephthalate film (PET) of 12 μm in thickness/intermediate layer of aluminum foil (Al) of 20 μm in thickness/inner layer of polyethylene film (PE) of 30 μm in thickness. The bag was left at 25° C. for 1 day and then the concentration of oxygen in the bag was measured with an oxygen meter. From this result, the amount of oxygen absorbed by the film-shaped oxygen scavenger 6 was determined. The tensile strength of the film-shaped oxygen scavenger before and after oxygen absorption was measured to determine the degree of retention of the tensile strength. These results are shown in Table 7. The measured tear strength of the film-shaped oxygen absorber was 148.6 N/mm, which is superior to Example 9. This is an effect achieved by mixing PE.

Comparative Example 8

A film-shaped oxygen scavenger C1 was obtained in the same manner as in Example 9 except that the block copolymer g was used in place of the block copolymer E. The amount of oxygen absorbed and the degree of retention of tensile strength were measured in the same manner as in Example 9. The results are shown in Table 7.

Comparative Example 9

After preparing 20% solution of β-pinene polymer (YS Resin PXN-1150N, manufactured by YASUHARA CHEMICAL CO., LTD.) in toluene, the solution was purified by precipitation with methanol to give β-pinene polymer from which an antioxidant was removed.

A film-shaped oxygen scavenger C2 was obtained in the same manner as in Comparative Example 8 except that the β-pinene polymer from which an antioxidant was removed was used in place of the block copolymer g. The amount of oxygen absorbed and the degree of retention of tensile strength were measured in the same manner as in Example 9. The results are shown in Table 7.

Comparative Example 10

According to Example 16 in Japanese Patent Application National Publication (Laid-Open) No. 2003-504042, an ethylene-cyclopentene (CPE) copolymer (weight-average molecular weight=83,500) wherein the cyclopentene (CPE) unit content is 15.5 mol %.

Prepared was 30% solution of the ethylene-CPE copolymer in toluene under a nitrogen atmosphere, then applied onto a polyethylene terephthalate film of 50 μm in thickness and dried to form an ethylene-CPE copolymer film of 120 μm in thickness. The ethylene-CPE copolymer film (film-shaped oxygen scavenger C3) was peeled from the polyethylene terephthalate film to give a test piece cut in 100 mm×100 mm. This film-shaped oxygen scavenger C3 was measured for the amount of oxygen absorbed and the degree of retention of tensile strength in the same manner as in Example 9. The results are shown in Table 7.

Comparative Example 11

A film-shaped oxygen scavenger C4 was obtained in the same manner as in Example 11 except that the block copolymer g was used in place of the block copolymer E. The amount of oxygen absorbed and the degree of retention of tensile strength were measured in the same manner as in Example 9. The results are shown in Table 7.

Comparative Example 12

After preparing 20% solution of β-pinene polymer (YS Resin PXN-1150N, manufactured by YASUHARA CHEMICAL CO., LTD.) in toluene, the solution was purified by precipitation with methanol to give β-pinene polymer from which an antioxidant was removed.

Prepared was 30% solution of the β-pinene polymer in toluene under a nitrogen atmosphere, and cobalt neodecanoate was added thereto in such an amount that the amount of cobalt metal became 1,000 ppm relative to the β-pinene polymer. This solution was applied onto a polyethylene terephthalate film of 50 μm in thickness and dried to form a β-pinene polymer film of 120 μm in thickness (film-shaped oxygen scavenger C5) The β-pinene polymer film could not completely peeled from the polyethylene terephthalate film, and thus the film without being peeled was cut into 100 mm×100 mm pieces which were then used as a test piece to determine the amount of absorbed oxygen in the same manner as in Example 9 provided that the amount of absorbed oxygen was calculated assuming that the surface area of only one side of the β-pinene polymer film (film-shaped oxygen scavenger C5) was the surface area of this film. The results are shown in Table 7.

Because the β-pinene polymer film (film-shaped oxygen scavenger C5) could not be peeled to such a degree that its tensile strength could be measured, the degree of retention of the tensile strength of the film-shaped oxygen scavenger (C5) was measured in the same manner as in Example 9. The results are shown in Table 7.

Comparative Example 13

According to Example 16 in Japanese Patent Application National Publication (Laid-Open) No. 2003-504042, an ethylene-cyclopentene (CPE) copolymer (weight-average molecular weight=83,500) wherein the cyclopentene (CPE) unit content is 15.5 mol %.

30% solution of the ethylene-CPE copolymer in toluene was prepared under a nitrogen atmosphere, and cobalt neodecanoate was added thereto in such an amount that the amount of cobalt metal became 1,000 ppm relative to the ethylene-CPE copolymer. The solution was applied onto a polyethylene terephthalate film of 50 μm in thickness and dried to form an ethylene-cyclopentene copolymer film (film-shaped oxygen scavenger C6) of 120 μm in thickness. The ethylene-CPE copolymer film (film-shaped oxygen scavenger C6) was peeled from the polyethylene terephthalate film to give a test piece cut in 100 mm×mm. This test piece was measured for the amount of oxygen absorbed and the degree of retention of tensile strength in the same manner as in Example 9. The results are shown in Table 7.

Example 15

The block copolymer F was finely pulverized by a laboratory blender (WARING BLENDOR model 34BL97, manufactured by WARING COMMERCIAL) in a nitrogen atmosphere to give a powdery oxygen scavenger 7 having a number-average particle diameter of 150 μm.

Together with 200 mL air, 2 g of the powdery oxygen scavenger 7 was sealed in a bag having a size of 150 mm×220 mm comprising 3 layers, that is, an outer layer of polyethylene terephthalate film (PET) of 12 μm in thickness/intermediate layer of aluminum foil (Al) of 20 μm in thickness/inner layer of polyethylene film (PE) of 30 μm in thickness. The bag was left at 30° C. for 1 day and then the concentration of oxygen in the bag was measured with an oxygen meter. The amount of oxygen absorbed by the powdery oxygen scavenger 7, as determined from this result, was 12 ml ($O_2$)/g day.

Table 7 reveals the following:

The cobalt salt-free oxygen scavenger (C1) using a styrene-isoprene copolymer added with maleic anhydride is inferior in oxygen absorption and the degree of retention of tensile strength (Comparative Example 8), and the oxygen scavenger (C4) obtained by incorporating a cobalt salt into the oxygen scavenger (C1) improves, but is still poor in, oxygen absorption and is inferior in the degree of retention of tensile strength (Comparative Example 11).

The cobalt salt-free oxygen scavenger (C2) using β-pinene polymer is inferior in oxygen absorption and the degree of retention of tensile strength (Comparative Example 9), and the oxygen scavenger (C5) obtained by incorporating a cobalt salt into the oxygen scavenger (C2) improves oxygen absorption and is inferior in the degree of retention of tensile strength (Comparative Example 12).

The cobalt salt-free oxygen scavenger (C3) using an ethylene-cyclopentene copolymer is inferior in oxygen absorption (Comparative Example 10), and the oxygen scavenger

TABLE 7

| | Examples | | | | | |
|---|---|---|---|---|---|---|
| | 9 | 10 | 11 | 12 | 13 | 14 |
| Oxygen absorbent Polymer | 1 Block copolymer-cyclized product E | 2 Block copolymer-cyclized product F | 3 Block copolymer-cyclized product E | 4 Block copolymer-cyclized product F | 5 Block copolymer-cyclized product E/PP | 6 Block copolymer-cyclized product E/PE |
| Presence or absence of cobalt metal | absent | absent | present | present | absent | absent |
| Amount of oxygen absorbed (ml/m² · day) | 54 | 61 | 58 | 63 | 44 | 25 |
| Retention degree of tensile strength | ○ | ○ | ○ | ○ | ○ | ○ |

| | Comparative Examples | | | | | |
|---|---|---|---|---|---|---|
| | 8 | 9 | 10 | 11 | 12 | 13 |
| Oxygen absorbent Polymer | C1 Block copolymer g | C2 β-Pinene polymer | C3 Ethylene-cyclopentane copolymer | C4 Block copolymer g | C5 β-Pinene polymer | C6 Ethylene-cyclopentane copolymer |
| Presence or absence of cobalt metal | absent | absent | absent | present | present | present |
| Amount of oxygen absorbed (ml/m² · day) | 5 | 9 | 2 | 46 | 58 | 52 |
| Retention degree of tensile strength | Δ | x | ○ | x | x | ○ |

(C6) obtained by incorporating a cobalt salt into the oxygen scavenger (C3) slightly improves, but is still poor in, oxygen absorption (Comparative Example 13).

On the other hand, the oxygen scavengers of the present invention are excellent in oxygen absorption and the degree of retention of tensile strength without containing a cobalt salt (Examples 9, 10, 13 and 14). The cobalt salt-containing oxygen scavengers of the present invention, even in a small amount, can further improve oxygen absorption (Examples 11 and 12).

The oxygen scavenger of the present invention, even in a powdery state, exhibits excellent oxygen absorption (Example 15).

The invention claimed is:

1. An oxygen scavenger comprising, as an active ingredient, a block copolymer,
    wherein the block copolymer comprises at least one poly (aromatic vinyl) block and at least one cyclized poly (conjugated diene) block,
    wherein the poly (aromatic vinyl) block has a weight-average molecular weight of 1,000 to 500,000 and the degree of cyclization of the cyclized poly (conjugated diene) block is within the range of 40% to 85%, and
    wherein the oxygen scavenger comprises no transition metal salt.

2. The oxygen scavenger according to claim 1, wherein the consumption degree of unsaturated bond in the cyclized poly (conjugated diene) block is 10% or more.

3. The oxygen scavenger according to claim 1, further comprising a thermoplastic resin.

4. The oxygen scavenger according to claim 3, wherein the thermoplastic resin is at least one member selected from the group consisting of a polyolefin resin, a polyester resin, a polyamide resin and a polyvinyl alcohol resin.

5. The oxygen scavenger according to claim 1, comprising an antioxidant of 500 ppm or less.

6. The oxygen scavenger according to claim 1, which is in the form of film, sheet or powder.

7. The oxygen scavenger according to claim 1, wherein the block copolymer comprises only one poly (aromatic vinyl) block and only one cyclized poly (conjugated diene) block.

8. The oxygen scavenger according to claim 1, wherein the block copolymer has a weight-average molecular weight of 10,000 to 1,000,000.

9. The oxygen scavenger according to claim 1, wherein the content of the aromatic vinyl monomer unit of the block copolymer is 1 to 90% by weight.

10. The oxygen scavenger according to claim 1, wherein the block copolymer has a polar group.

11. The oxygen scavenger according to claim 10, wherein the content of the polar group of the block copolymer is 0.1 to 200 millimoles/100 g.

* * * * *